United States Patent
Ramme

(12) 
(10) Patent No.: US 9,028,607 B2
(45) Date of Patent: *May 12, 2015

(54) CARBON DIOXIDE SEQUESTRATION IN FOAMED CONTROLLED LOW STRENGTH MATERIALS

(75) Inventor: Bruce W. Ramme, Okauchee, WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 1894 days.

This patent is subject to a terminal disclaimer.

(21) Appl. No.: 12/138,019

(22) Filed: Jun. 12, 2008

(65) Prior Publication Data
US 2008/0245274 A1    Oct. 9, 2008

Related U.S. Application Data

(63) Continuation-in-part of application No. 11/064,756, filed on Feb. 24, 2005, now Pat. No. 7,390,444.

(51) Int. Cl.
| | | |
|---|---|---|
| *B01D 53/62* | (2006.01) | |
| *C04B 18/02* | (2006.01) | |
| *C04B 28/02* | (2006.01) | |
| *C04B 28/08* | (2006.01) | |
| *C04B 111/54* | (2006.01) | |

(52) U.S. Cl.
CPC .......... *B01D 53/62* (2013.01); *B01D 2251/404* (2013.01); *B01D 2257/504* (2013.01); *B01D 2259/80* (2013.01); *C04B 18/027* (2013.01); *C04B 28/021* (2013.01); *C04B 28/08* (2013.01); *C04B 2111/542* (2013.01); *Y02C 10/04* (2013.01)

(58) Field of Classification Search
None
See application file for complete search history.

(56) References Cited

U.S. PATENT DOCUMENTS

| 109,669 | A | 11/1870 | Rowland |
|---|---|---|---|
| 128,980 | A | 7/1872 | Rowland |
| 591,168 | A | 10/1897 | Heinzerling |
| 1,449,696 | A | 3/1923 | Pike |

(Continued)

FOREIGN PATENT DOCUMENTS

| CH | 644828 | 8/1984 |
|---|---|---|
| DE | 4207235 | 9/1993 |

(Continued)

OTHER PUBLICATIONS

ASTM C 618, "Standard Specification for Fly Ash and Raw or Calcined Natural Pozzolan for Use as a Mineral Admixture in Portland Cement Concrete", 1999.

(Continued)

*Primary Examiner* — Kaj K Olsen
*Assistant Examiner* — Karam Hijji
(74) *Attorney, Agent, or Firm* — Quarles & Brady LLP

(57) ABSTRACT

A process for sequestering carbon dioxide from the exhaust gas emitted from a combustion chamber is disclosed. In the process, a foam including a foaming agent and the exhaust gas is formed, and the foam is added to a mixture including a cementitious material (e.g., cement-kiln dust, lime kiln dust, or slag cement) and water to form a foamed mixture. Thereafter, the foamed mixture is allowed to set, preferably to a controlled low-strength material having a compressive strength of 1200 psi or less. The carbon dioxide in the exhaust gas reacts with hydration products in the controlled low-strength material and in turn sequesters the carbon dioxide.

25 Claims, 1 Drawing Sheet

(56) References Cited

U.S. PATENT DOCUMENTS

| | | |
|---|---|---|
| 1,966,419 A | 7/1934 | Pontoppidan |
| 1,966,864 A | 7/1934 | Knibbs |
| 3,867,159 A | 2/1975 | Ergene |
| 4,069,063 A | 1/1978 | Ball |
| 4,093,690 A | 6/1978 | Murray |
| 4,117,060 A | 9/1978 | Murray |
| 4,350,567 A | 9/1982 | Moorehead et al. |
| 4,362,679 A | 12/1982 | Malinowski |
| 4,374,672 A | 2/1983 | Funston et al. |
| 4,383,862 A | 5/1983 | Dyson |
| 4,407,676 A | 10/1983 | Restrepo |
| 4,415,366 A | 11/1983 | Copening |
| 4,427,610 A | 1/1984 | Murray |
| 4,872,913 A | 10/1989 | Dunton et al. |
| 4,900,359 A | 2/1990 | Gelbman |
| 5,013,157 A | 5/1991 | Mills et al. |
| 5,051,217 A | 9/1991 | Alpar et al. |
| 5,307,876 A | 5/1994 | Cowan et al. |
| 5,397,553 A | 3/1995 | Spencer |
| 5,435,843 A | 7/1995 | Roy et al. |
| 5,518,540 A | 5/1996 | Jones, Jr. |
| 5,634,972 A * | 6/1997 | Pacanovsky et al. ......... 106/696 |
| 5,650,562 A | 7/1997 | Jones, Jr. |
| 5,654,352 A | 8/1997 | MacDonald |
| 5,690,729 A | 11/1997 | Jones, Jr. |
| 5,897,704 A | 4/1999 | Baglin |
| 5,918,429 A | 7/1999 | Hicks et al. |
| 5,935,317 A * | 8/1999 | Soroushian et al. .......... 106/723 |
| 5,951,751 A | 9/1999 | Williams et al. |
| 5,965,201 A | 10/1999 | Jones, Jr. |
| 6,046,255 A * | 4/2000 | Gray et al. ..................... 523/218 |
| 6,153,005 A | 11/2000 | Welker et al. |
| 6,162,839 A | 12/2000 | Klauck et al. |
| 6,235,092 B1 | 5/2001 | Spencer |
| 6,264,736 B1 | 7/2001 | Knopf et al. |
| 6,334,895 B1 * | 1/2002 | Bland ........................... 106/705 |
| 6,352,576 B1 | 3/2002 | Spencer et al. |
| 6,372,023 B1 | 4/2002 | Kiyono et al. |
| 6,387,174 B2 | 5/2002 | Knopf et al. |
| 6,461,424 B1 | 10/2002 | Ramme et al. |
| 6,521,021 B1 | 2/2003 | Pennline et al. |
| 6,569,388 B1 | 5/2003 | Fan et al. |
| 6,648,949 B1 | 11/2003 | Der et al. |
| 7,390,444 B2 | 6/2008 | Ramme et al. |
| 2008/0178770 A1 * | 7/2008 | Schumacher et al. ........ 106/708 |

FOREIGN PATENT DOCUMENTS

| | | |
|---|---|---|
| JP | 218368 | 1/1990 |
| JP | 6263562 | 9/1994 |

OTHER PUBLICATIONS

American Concrete Institute Committee 229, "Controlled Low-Strength Materials", ACI 229R-99, pp. 229R-1 to 229R-15, Jun. 1999.

* cited by examiner

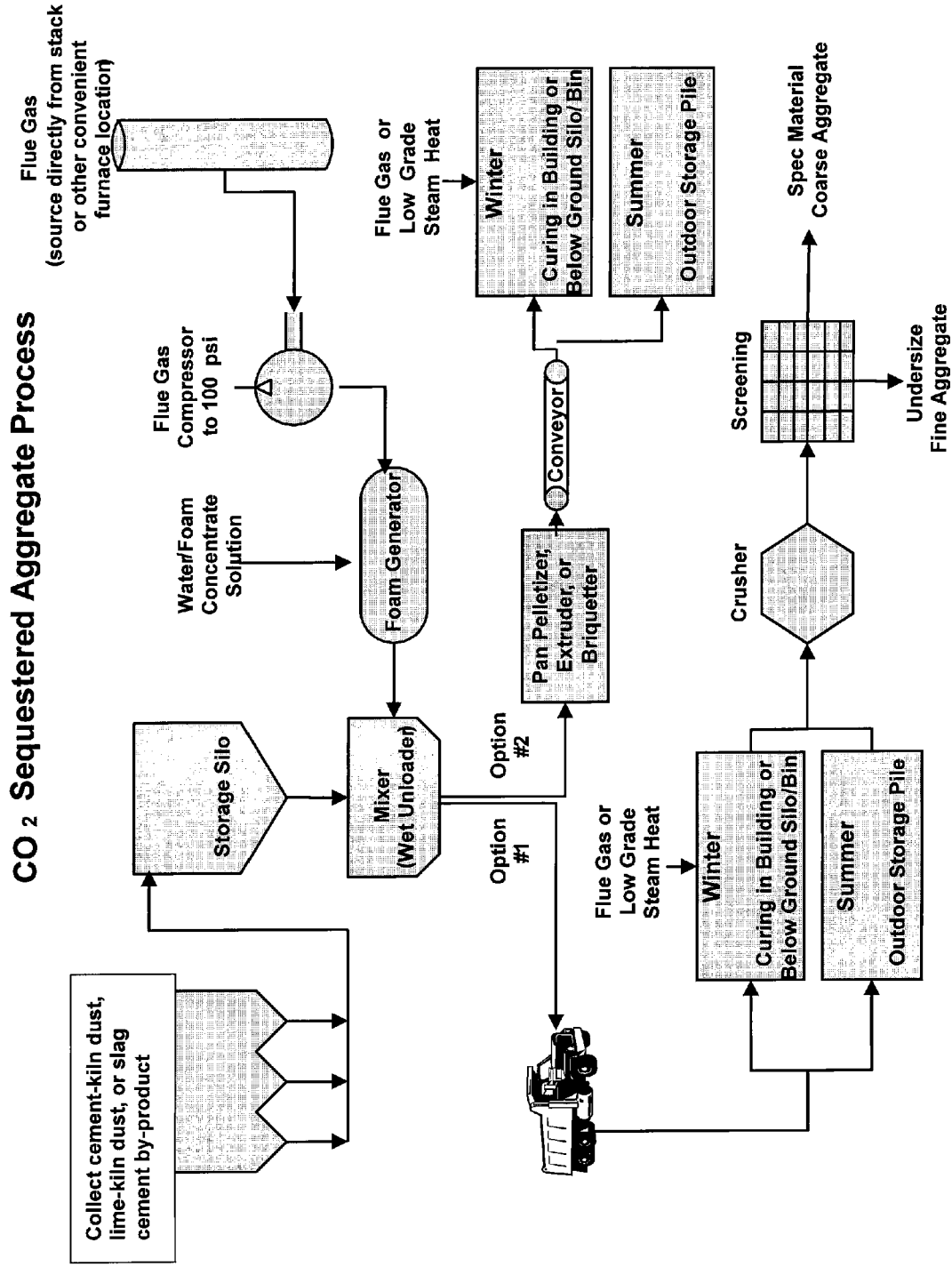

CARBON DIOXIDE SEQUESTRATION IN FOAMED CONTROLLED LOW STRENGTH MATERIALS

CROSS-REFERENCES TO RELATED APPLICATIONS

This application is a continuation-in-part of U.S. patent application Ser. No. 11/064,756, filed Feb. 24, 2005 now U.S. Pat. No. 7,390,444, which is incorporated herein by reference.

STATEMENT REGARDING FEDERALLY SPONSORED RESEARCH

Not Applicable.

BACKGROUND OF THE INVENTION

1. Field of the Invention

This invention relates to a process for sequestering carbon dioxide through the production of lightweight controlled low-strength materials.

2. Description of the Related Art

Man made carbon dioxide ($CO_2$) has been viewed by some as being a pollutant. There are many sources of $CO_2$ including power plants, cement manufacturing, lime manufacturing, iron production, vehicles, natural gas ensuing from wells, ammonia manufacturing, fermentation, hydrogen production (e.g., in oil refining), and producing hydrogen fuels from carbon-rich feedstocks, such as natural gas, coal, and biomass. Thus, there has been interest in processes for sequestering carbon dioxide.

Permanent sequestration of carbon dioxide can occur by terrestrial ecosystems. For example, in forests and trees, 74,806 metric tons of carbon dioxide can be sequestered per 1,000-acre plantation in seven years. Also, grasses and prairies, such as the United States Great Plains, sequester 740 kg/ha/year. Agricultural and biomass croplands, boreal wetlands and peatlands in United States agricultural lands sequester carbon dioxide at rates of 75-200 million metric tons per year.

Permanent sequestration of $CO_2$ can also occur by advanced chemical and biological sequestration wherein $CO_2$ is converted into either commercial products that are inert and long lived or that are stable solid compounds. Examples include: magnesium carbonate, $CO_2$ ice-like material, advanced catalysts for $CO_2$ and CO conversion, engineered photosynthesis systems, non-photosynthetic mechanisms for $CO_2$ fixation (methanogenesis and acetogenesis), genetic manipulation of agriculture and forests to enhance $CO_2$ sequestering potential, advanced decarbonization systems, and biomimetic systems.

Permanent sequestration of carbon dioxide also occurs by the natural carbonation of concrete. About 0.2 pounds of carbon dioxide is absorbed per 1 pound of cement in concrete over time. During a typical year of concrete construction in the United States, 274,000 metric tons of atmospheric $CO_2$ are absorbed. Over a 100-year period, all of the concrete produced during a single typical year will absorb 2,906,000 metric tons.

Various methods are known for storing carbon dioxide in geological media such as enhanced oil recovery, storage in depleted oil and gas reservoirs, replacement of methane by carbon dioxide in deep coal beds, injection into deep saline aquifers, and storage in salt caverns. Also, ocean sequestration of carbon dioxide is known. Carbon dioxide may be stored underwater in large canyons or injected directly into the deep ocean, via pipeline or tanker. Furthermore, oceans naturally sequester carbon dioxide. It has also been proposed to capture carbon dioxide by microalgae, ocean fertilization, or non-biological capture from the air.

Of course, various methods for reducing carbon dioxide production are also known. For example, power plant efficiency can be increased by way of: (i) processes, such as flue gas separation, oxy-fuel combustion, and pre-combustion separation, and (ii) systems, such as solvents (chemical, physical, and hybrid systems), membranes, cryogenic separation, solid-bed adsorbents, and combined systems. Carbon dioxide production can also be reduced by decreased manufacturing of cement through use of alternatives to conventional cement like fly ash. Decreased use of vehicles can also reduce carbon dioxide production.

It has been reported that in 2000, carbon dioxide emissions reached 5.8 billion metric tons and that approximately 80% of annual emissions come from the burning of fossil fuels. Therefore, there have been efforts to limit man made carbon dioxide emissions from fossil fuel burning plants. U.S. Pat. No. 6,235,092 provides a discussion of a variety of processes that have been developed for removing a gaseous component (such as carbon dioxide) from a multicomponent gaseous stream (such as the exhaust gas stream of a coal burning electrical power generation plant). Selective adsorption by solid adsorbents and gas absorption are named as two example processes. This patent further mentions that gas absorption finds use in the separation of $CO_2$ from multicomponent gaseous streams. It is reported that in some $CO_2$ gas absorption processes, the following steps are employed: (1) absorption of $CO_2$ from the gaseous stream by a host solvent such as monoethanolamine; (2) removal of $CO_2$ from the host solvent by steam stripping; and (3) compression of the stripped $CO_2$ for disposal such as by sequestration through deposition in the deep ocean or ground aquifers. Other patents describing $CO_2$ sequestration methods include U.S. Pat. Nos. 6,648,949, 6,372,023 and 5,397,553.

Although these processes may be successful in sequestering carbon dioxide, they can be energy intensive. Thus, there is continued interest in the development of less energy intensive processes for sequestering carbon dioxide from the exhaust gas streams of industrial and power generation plants.

It is also known that cement-kiln dust, lime-kiln dust, and slag cement are voluminous cementitious by-products of industry, presenting air quality and environmental disposal issues. Cement-kiln dust is a by-product of the manufacture of portland cement, and nearly 4 million tons of cement kiln dust are disposed of every year in the United States. Maintaining cement-kiln dust landfills is expensive and difficult because of the fine, dusty nature of the material, and disposal costs add significantly to the cost of cement manufacture. Cement manufacturers are making efforts to minimize the generation of cement kiln dust and to develop alternative uses for this material.

Lime-kiln dust is a by-product of the manufacture of lime in a rotary kiln. Lime-kiln dust has limited use as a raw material in cement production and is commonly used in agriculture as a soil stabilizer or soil-modifying agent. As with cement-kiln dust, manufacturers are making efforts to reduce disposal costs and environmental impact by minimizing the generation of lime-kiln dust and developing alternative uses for the material.

Slag cement is a by-product of iron production. When mixed with portland cement, it is used in concrete and other construction applications. The use of slag cement in concrete and cement mixes has economic and environmental benefits, reducing slag disposal costs, greenhouse gas emissions, and total energy use.

Controlled low-strength materials are described in the publication "Controlled Low-Strength Materials", reported by American Concrete Institute Committee 229, June 1999, as self-compacted, cementitious materials used primarily as a backfill in place of compacted fill. Conventional CLSM mixtures consist of water, portland cement, fly ash, and, optionally, additional fine or coarse aggregates. However, CLSM mixtures can be made of other cementitious materials mixed with water. This publication defines CLSM as a material that results in a compressive strength of 8.3 MPa (1200 psi) or less at the conventional 28 day testing period (typically without compaction), and notes that most current CLSM applications require unconfined compressive strengths of 2.1 MPa (300 psi) or less at the conventional 28 day testing period in order to allow future excavation. The use of cement-kiln dust, lime-kiln dust, and/or slag cement in CLSM provides a environmentally beneficial use for these cementitious materials.

It is also known that the density of cement-containing materials can be lowered by entraining gas in the materials. For example, U.S. Pat. No. 3,867,159 describes cellular concrete structures made by mixing water and cement followed by the introduction of a foam produced by a foam generator. U.S. Pat. No. 4,383,862 discloses a method of producing aerated concrete wherein a gas such as air, carbon dioxide, or a mixture thereof is introduced into a blender with a mortar mix. U.S. Pat. No. 5,654,352 describes air-entraining agents for use in cementitious mixtures. Some of these mixtures are reported as being controlled low-strength materials. U.S. Pat. Nos. 6,153,005, 5,013,157, 4,900,359, 4,415,366 and 4,407,676 describe related processes.

It is also known that the hardening of cement-containing materials can be accelerated by carbonation in which calcium hydroxide in the cement is transformed into calcium carbonate by absorbing carbon dioxide. Related processes are described in U.S. Pat. Nos. 6,387,174, 6,264,736, 5,965,201, 5,897,704, 5,690,729, 5,650,562, 5,518,540, 5,307,876, 5,051,217, 4,427,610, 4,362,679, 4,350,567, 4,117,060, 4,093,690 and 4,069,063, German patent application DE 4207235, Swiss patent application CH 644828, and Japanese patent applications JP 6263562 and JP 2018368.

There is a continuing need to safely and economically dispose of such industrial by-products as cement-kiln dust, lime-kiln dust, and slag cement; thus, there is a continuing need for products and processes that make environmentally beneficial use of these by-products. In addition, increasing global concerns regarding greenhouse gas emissions have created a continuing need for products and processes that permanently remove free carbon dioxide from the environment.

SUMMARY OF THE INVENTION

The foregoing needs are met by a process according to the invention for sequestering carbon dioxide from the flue gas emitted from a combustion chamber such as that included in a fossil fuel burning power plant, a cement kiln, a lime kiln, or a blast furnace. In the process, a foam including a foaming agent and the flue gas is formed, and the foam is added to a mixture including a cementitious material (e.g., cement-kiln dust, lime-kiln dust, or slag cement) to form a foamed mixture. Thereafter, the foamed mixture is allowed to set, preferably to a controlled low-strength material having a compressive strength of 1200 psi or less.

In the process, the normal air used in producing the foam is replaced with carbon dioxide and flue gas generated from the electric power or industrial production plant. The carbon dioxide in the flue gas reacts with hydration products in the controlled low-strength material and in turn sequesters the carbon dioxide. In a typical material, carbonation occurs at the surface, where the material is exposed to a source of carbon dioxide, for example from air, and slowly penetrates further in depth. In contrast, lightweight foamed controlled low-strength materials are particularly suitable to increase the surface area exposed to carbon dioxide. In the foamed controlled low-strength material of the present invention, there are millions of air bubbles that contain carbon dioxide, so there can be an almost unlimited amount of surface area of controlled low-strength material where carbonation may occur. In the process, the compressive strength of the controlled low-strength material increases due to the carbonation. Also advantageously, the man made carbon dioxide emissions from a fossil fuel burning plant are decreased by sequestration of the carbon dioxide in the foamed controlled low-strength material.

Carbonation occurs when part of the calcium hydroxide formed during hydration of cementitious materials containing calcium oxide, such as cement-kiln dust, lime-kiln dust, or slag cement, combines in the course of hardening with the carbon dioxide and produces calcium carbonate in the following chemical reaction.

$$Ca(OH)_2 + CO_2 \rightarrow CaCO_3 + H_2O$$

Calcium Hydroxide+Carbon Dioxide→Calcium Carbonate+Water

Cement-kiln dust, lime-kiln dust, and slag cement all contain substantial amounts of calcium oxide. When hydrated with water, the calcium oxide is converted to calcium hydroxide. Thus, when a controlled low-strength material mixture of any of those materials and water is made, there is a sufficient quantity of calcium hydroxide present for the carbonation reaction to occur, and for concurrently sequestering free carbon dioxide and increasing the compressive strength of the controlled low-strength material.

It should be appreciated that the process of the invention is not limited to sequestering carbon dioxide from the flue gas emitted from a combustion chamber. The process may be used to sequester carbon dioxide from other mixed gases including carbon dioxide. Also, other exhaust gases can be used in the process. For example, other fossil fuel combustion gas from related industrial processes (such as kiln exhaust or blast furnace exhaust gas) are suitable for use in the process. All are a result of fossil fuel combustion and contain $CO_2$ and useful residual heat for curing in winter climates.

It is therefore an advantage of the present invention to provide products and processes that make environmentally beneficial use of the carbon dioxide, cement-kiln dust, lime-kiln dust, and slag cement produced as by-products of fossil fuel burning power plants and industrial production plants.

These and other features, aspects, and advantages of the present invention will become better understood upon consideration of the following detailed description, drawings, and appended claims.

BRIEF DESCRIPTION OF THE DRAWINGS

FIG. 1 is a schematic showing an example process according to the invention.

DETAILED DESCRIPTION OF THE INVENTION

Turning to FIG. 1, there is shown an example process according to the invention. In a first step, flue gas is removed from a combustion chamber such as that of a coal-fired power plant or cement kiln. The flue gas source may be an exhaust stack or other convenient furnace location where flue gas is emitted from the combustion chamber. While the example process is typically used in the context of flue gas generated by a coal-fired power plant, it is not limited to such applications.

In general, coal-fired power plant flue gas may include fly ash, nitrogen, oxygen, carbon dioxide, nitrogen oxides, water, carbon monoxide, sulfur oxides, mercury, and various acid gases. The precise composition of the flue gas is determined by the nature of the process generating the flue gas and can vary significantly in time. In studies reported in U.S. Pat. No. 6,521,021, the United States Combustion Environmental Research Facility operates a pulverized coal combustion unit that simulates the firing of a utility power plant and that produces a simulated flue gas containing 16% carbon dioxide, 5% oxygen, 2000 ppm sulfur dioxide, 500 ppm nitric oxide, 270 ppb elemental mercury, and the remainder nitrogen.

In a second step of the process of the invention, the flue gas is fed via a conduit to a compressor where the flue gas is compressed to a higher pressure. One example pressure after compression is 100 psi, although the invention is not limited to that pressure.

Still referring to FIG. 1, the compressed flue gas is then fed via a conduit to a foam generator. A typical foam generator will include an input for water, an input for a foaming agent, and an input for the compressed flue gas which arrives via the conduit from the compressor. Foam generators are commercially available, and example suppliers include Elastizell Corporation of America, Ann Arbor, Mich., USA, and Cellular Concrete LLC, Roselle Park, N.J., USA. The foaming agent is typically a soap or a surfactant. Foaming agents are also commercially available, and one example supplier is Elastizell. Another example supplier is Cellular Concrete LLC, which sells aqueous surface-active polypeptide-alkylene polyol condensate foaming agents under the trade names Mearicrete® and Geofoam™.

The foam generator mixes the water and the foaming agent in a selectable ratio to form a pre-foaming solution. The compressed flue gas and the pre-foaming solution are then fed through an exit conduit of the foam generator which creates a foam by expansion of the pre-foaming solution with the gas. By "foam" herein, we mean a dispersion of gas in a liquid solution. The flue gas globules may be of any size from colloidal to macroscopic. The pre-foaming solution must have sufficient cohesion to form an elastic film. While the preferred foam generator produces a mechanical foam (i.e., a foam produced by mixing gas with water containing a foaming agent), chemical foams (i.e., foams produced by a chemical reaction that produces gas) could supplement the mechanical foam. The foam generator may be specially manufactured to handle a large scale process. The use of the generated foam will be described further below.

Referring still to FIG. 1, in a separate process step, cement-kiln dust, lime kiln dust, and/or slag cement are obtained. Cement-kiln dust, commonly referred to as CKD, is a by-product captured from the hot gasses in dust collectors during the manufacture of portland cement. It is collected during the cement manufacturing process in a dust collecting and recycling baghouse. CKD differs from portland cement in that the raw ingredients added in a kiln to produce cement may not have been fully burned. CKD consists mainly of calcium, silica, and aluminum oxides along with smaller quantities of calcium sulfate, potassium oxides, sodium oxides, and metals derived from the raw ingredients utilized in cement manufacturing, which include limestone and clay, and sometimes may include slate, fly ash, and slag.

CKD generally has a specific gravity around 2.8 and a maximum dry density of 1,520 kg/m$^3$. The maximum particle size of CKD is typically 0.3 mm (No. 50 sieve) and often 75% of the material passes through a 0.03 mm (No. 450 sieve) opening. The amount and compound form of calcium oxide and amount of free lime available from CKD varies between the cement manufacturing facilities.

Lime-kiln dust is commonly referred to as LKD and is a by-product of lime manufacturing in a rotary kiln. Limestone (usually primarily consisting of calcium carbonate) is heated in the kiln, which drives off carbon dioxide and forms lime (calcium oxide). LKD is collected from hot gasses in dust collectors and can vary chemically depending on the type of limestone being used. The available CaO content can range typically from 20 to 40%. LKD is mainly calcium oxide but contains varying amounts of magnesium oxide if dolomitic limestone is used, calcium sulfate depending on the sulfur content of the kiln fuel, fly ash when coal is used as the fuel, and dust from limestone handling and unburned limestone. Other impurities such as silica, iron, aluminum, and other metals may also be present, but in very small amounts, because the limestone used for the manufacture of lime is typically quite pure to meet chemical standards. LKD differs from commercial lime in that the raw ingredients in LKD have not been fully burned.

LKD has a specific gravity that typically falls between 2.4 and 3.0 and a bulk density that falls between 720-1150 kg/m$^3$. The particle size range of LKD falls between 0.005 mm and 2.0 mm and generally 75% of the material passes through a 0.03 mm (No. 450 sieve). The amount of calcium oxide and amount of free-lime present in LKD varies between lime manufacturing facilities depending on the source of the limestone and kiln process used.

Slag cement (also called ground granulated blast furnace slag) is a hydraulic cement produced during the reduction of iron ore to iron in a blast furnace. Molten slag is tapped from a blast furnace, rapidly quenched with water ("granulated"), dried, and ground to a fine powder. The rapid quenching 'freezes' the molten slag in a glassy state, which gives the product its cementitious properties.

When iron is manufactured using a blast furnace, the furnace is continuously charged from the top with oxides, fluxing material, and fuel. Two products—slag and iron—collect in the bottom of the hearth. Molten slag floats on top of the molten iron; both are tapped separately. The molten iron is sent to the steel producing facility, while the molten slag is diverted to a granulator. This process, known as granulation, is the rapid quenching with water of the molten slag into a raw material called granules. Rapid cooling prohibits the formation of crystals and forms glassy, non-metallic, silicates and alumino-silicates of calcium. These granules are dried and then ground to a suitable fineness, the result of which is the slag cement. The granules can also be incorporated as an ingredient in the manufacture of blended portland cement. Slag cement (ground granulated blast furnace slag) typically has a specific gravity that falls between 2.85 and 2.94, and consists of about 45% CaO, 33% $SiO_2$, 10% $Al_2O_3$, 1% $Fe_2O_3$, and 6% MgO.

In a next process step of FIG. 1, cement-kiln dust, lime kiln dust, and/or slag cement are combined with foam from the foam generator and water in a mixer (wet unloader) to form a foamed mixture. Various foamed mixtures of the cementitious material, foam and water are possible. In one specific embodiment, the foamed mixture includes about 1275 pounds of cement-kiln dust per cubic yard of the foamed mixture and about 960 pounds of water per cubic yard of the foamed mixture. In another specific embodiment, the foamed mixture includes about 1575 pounds of lime-kiln dust per cubic yard of the foamed mixture and about 660 pounds of water per cubic yard of the foamed mixture. In a third specific embodiment, the foamed mixture includes about 1600 pounds of slag cement per cubic yard of the foamed mixture and about 650 pounds of water per cubic yard of the foamed mixture. These specific embodiments are not limiting in the possible proportions of cementitious material, water, and foam that could be used in the foamed mixture. Also, an over dosage of foam is beneficial in certain cases because of the instability/breakdown of the foam during mixing.

In addition to cement-kiln dust, lime kiln dust, or slag cement, other cementitious materials may also be used in the foamed mixture. Examples of other cementitious materials that could be added include portland cement and fly ash. It is also contemplated that other materials, such as fine aggregate and coarse aggregate, may be included in the foamed mixture. However, in certain embodiments, the foamed mixture may consist essentially of water, cement-kiln dust and foam; water, lime-kiln dust and foam; or water, slag cement and foam. This avoids the need to integrate other materials into the foamed mixture that may affect properties of the final cured product.

After the foamed mixture is prepared, different process steps may be undertaken. In Option #1 of FIG. 1, the foamed mixture is removed from the mixer and loaded onto a vehicle that transports the foamed mixture to a curing station where the foamed mixture sets. In geographic locations where cold winters are experienced, the foamed mixture may be transported to a curing station in the power plant building or to a below ground silo/bin. In order to accelerate curing/setting of the foamed mixture, flue gas and/or low grade stream heat, preferably recovered from the power plant, are passed over and/or through the foamed mixture. During the summer season, or in geographic locations where cold winters are not experienced, the foamed mixture may be transported to an outdoor storage pile for curing/setting of the foamed mixture.

During curing/setting of the foamed mixture, the carbon dioxide in the flue gas dispersed in the foaming agent reacts with hydration products in the foamed mixture and in turn sequesters the carbon dioxide. The cured/set foamed mixture typically meets the standards for controlled low-strength materials as published by the American Concrete Institute. For example, the process of the invention produces a controlled low-strength material that results in a compressive strength of 8.3 MPa (1200 psi) or less at the conventional 28 day testing period, and may produce a controlled low-strength material with unconfined compressive strengths of 2.1 MPa (300 psi) or less at the conventional 28 day testing period.

Referring still to FIG. 1, after curing/setting of the foamed mixture, the cured mass may be crushed into aggregate and thereafter screened into an undersize fine aggregate fraction and a coarse aggregate fraction that meets a predetermined coarse aggregate material specification such as those published by the American Society for Testing and Materials.

In Option #2 of FIG. 1, the foamed mixture is removed from the mixer and fed to a shaping device such as a pan pelletizer, extruder or briquetter for shaping into aggregate. In geographic locations where cold winters are experienced, the shaped aggregate is conveyed to a curing station in the power plant building or to a below ground silo/bin. In order to accelerate curing/setting of the shaped aggregate, flue gas and/or low grade stream heat, preferably recovered from the power plant, are passed over and/or through the shaped aggregate. During the summer season, or in geographic locations where cold winters are not experienced, the shaped aggregate may be transported to an outdoor storage pile for curing/setting of the shaped aggregate.

EXAMPLES

The following Examples have been presented in order to further illustrate the invention and are not intended to limit the invention in any way.

1. Experimental Overview

The experiments detailed below included performance testing and evaluation of foamed controlled low-strength materials (CLSM) produced using a commercial foam generator. The CLSM included mixtures of cement-kiln dust, water, and foam; lime-kiln dust, water, and foam; and slag cement, water, and foam. The CLSM were produced using the foam generator with one of three different types of compressed gases: air, carbon dioxide, and a mixed gas. This mixed gas was used to simulate a typical flue gas generated from the combustion of coal at a typical electric power plant. The experiments explored the feasibility of using flue gas to generate a low-density CLSM with sufficient strength to be used as a lightweight aggregate. It was determined that the use of the flue gas promotes carbonation of the sample thereby increasing the compressive strength and binding the carbon dioxide in the carbonation reaction. It was also determined that the carbonation reaction of the CLSM could reduce carbon dioxide emissions at a coal-fired power plant. The use of a foam generator was intended to have two effects on the CLSM produced, to lower the density of the material, and to distribute the selected gas throughout the CLSM. The distributed gas bubbles would then provide a source for the carbonation reaction within the CLSM.

2. Materials

A. Cementitious Materials

Cement-Kiln Dust, Lime-Kiln Dust, and Slag Cement

Cement-kiln dust was obtained from the Lafarge North America cement manufacturing facility located in Alpena, Mich. Dolomitic lime-kiln dust was obtained from the Western Lime manufacturing facility located in Eden, Wis. Slag cement was obtained from the Holcim (U.S.) Inc. facility located in Chicago, Ill.

Moisture contents of the three cementitious by-product materials collected for use in these examples were obtained by thermo gravimetric analysis in accordance with ASTM C 311, "Standard Test Method for Sampling and Testing of Fly Ash or Natural Pozzolans for use in Portland Cement Concrete." The moisture content test results are shown in Table 1.

TABLE 1

| | Percent Moisture | | |
|---|---|---|---|
| Material | Initial Mass (gm) | Percent (%) Moisture | Average % Moisture |
| CKD | 1.046 | 0.067 | |
| CKD | 1.158 | −0.086 | 0.021 |
| CKD | 1.248 | 0.120 | |

TABLE 1-continued

Percent Moisture

| Material | Initial Mass (gm) | Percent (%) Moisture | Average % Moisture |
|---|---|---|---|
| LKD | 1.838 | 0.266 | |
| LKD | 1.418 | 0.226 | 0.23 |
| LKD | 1.551 | 0.200 | |
| Slag | 1.512 | 0.106 | |
| Slag | 1.620 | 0.074 | 0.09 |
| Slag | 1.521 | 0.079 | |

Loss-on-ignition (LOI) values for the three cementitious by-product materials collected for use in these examples were obtained by thermo gravimetric analysis in accordance with ASTM C 311, "Standard Test Method for Sampling and Testing of Fly Ash or Natural Pozzolans for use in Portland Cement Concrete." The measured values for loss on ignition represent the consumption of organic material such as carbon and the volatilization of the alkali compounds found in the materials. The CKD and LKD are not fully calcined and the higher numbers shown represent completion of this process combined with combustion of any residual organic compounds such as carbon. The slag is produced at very high temperatures and is calcined with very few organics present to be removed in this test. In the case of slag, the material is actually absorbing a small amount of mass from the test atmosphere elements present. The LOI results are shown in Table 2.

TABLE 2

Percent Loss on Ignition (LOI) - Dry Basis

| Material | Initial Mass (gm) | Percent (%) Ash | Percent (%) LOI | Average % LOI |
|---|---|---|---|---|
| CKD | 1.046 | 90.67 | 9.268 | |
| CKD | 1.158 | 90.37 | 9.711 | 9.4 |
| CKD | 1.248 | 90.62 | 9.276 | |
| LKD | 1.838 | 77.27 | 22.53 | |
| LKD | 1.418 | 77.34 | 22.49 | 22.5 |
| LKD | 1.551 | 77.44 | 22.41 | |
| Slag | 1.512 | 100.5 | −0.583 | |
| Slag | 1.620 | 100.5 | −0.562 | −0.6 |
| Slag | 1.521 | 100.5 | −0.586 | |

The density and specific gravity of each material was obtained by standard gravimetric analysis in accordance with ASTM C 188, "Standard Test Method for Density of Hydraulic Cement" and ASTM C 311, "Standard Test Method for Sampling and Testing Fly Ash or Natural Pozzolans for Use in Portland-Cement Concrete." The values measured were in the expected ranges for these by-product materials, and are shown in Table 3.

TABLE 3

Specific Gravity of Materials

| Material | Actual Mass (gm) | Volume (ml) | Specific Gravity | Average SG |
|---|---|---|---|---|
| CKD | 67.41 | 23.2 | 2.911 | |
| CKD | 64.06 | 21.4 | 2.999 | 2.98 |
| CKD | 63.99 | 21.2 | 3.024 | |
| LKD | 63.54 | 22.6 | 2.817 | |
| LKD | 60.64 | 21.6 | 2.813 | 2.80 |
| LKD | 62.22 | 22.5 | 2.771 | |
| Slag | 51.07 | 17.7 | 2.891 | |

TABLE 3-continued

Specific Gravity of Materials

| Material | Actual Mass (gm) | Volume (ml) | Specific Gravity | Average SG |
|---|---|---|---|---|
| Slag | 55.69 | 18.3 | 3.049 | 2.97 |
| Slag | 55.71 | 18.8 | 2.969 | |

The three finely divided mineral by-products were analyzed for oxides content by the X-ray fluorescence test method (ASTM D 4326, "Standard Test Method for Major and Minor Elements in Coal and Coke Ash by X-ray Fluorescence"). All three by-products had substantial amounts of compounds with the potential capability to react with $CO_2$ and form carbonate minerals. The calcium oxide (lime) content was found to be highest in the cement kiln dust at 49.8% followed by the blast furnace slag at 38.2%, and lime kiln dust at 32.7%. The magnesium oxide content was found to be the highest in the dolomitic based lime kiln dust at 24.9%, followed by blast furnace slag at 11.0%, and cement kiln dust at 2.2%. Complete results are shown in Table 4.

TABLE 4

Mineral Oxides Analysis of By-Product Materials (%)

| Mineral Analysis | Cement Kiln Dust (CKD) | Lime Kiln Dust (LKD) | Blast Furnace Slag (SLG) |
|---|---|---|---|
| $SiO_2$ | 14.47 | 9.5 | 39.2 |
| $Al_2O_3$ | 5.1 | 4.8 | 10.4 |
| $Fe_2O_3$ | 2.0 | 1.1 | 0.7 |
| CaO | 49.8 | 32.7 | 38.2 |
| MgO | 2.2 | 24.9 | 11.0 |
| $K_2O$ | 3.8 | 0.8 | 0.4 |
| $SO_3$ | 12.3 | 0.5 | 1.2 |
| $TiO_2$ | 0.0 | 0.0 | 0.4 |
| LOI 750° C. | 9.4 | 22.5 | −0.5 |
| LOI 1000° C. | 10.5 | 24.9 | −1.5 |
| SUM | 100.0 | 100.0 | 100.0 |
| Available Alkali | 6.8 | 4.0 | 0.5 |

B. Foam Concentrate

A foam concentrate solution was used for generating foam. The foam concentrate was obtained from Elastizell Corporation of America, Dexter, Mich., USA. Prior to mixing the CLSM, the foam concentrate was diluted with water at a ratio of 40 parts of water to one part of foam concentrate by volume. Temperature of the water used to mix the foam concentrate was increased when carbon dioxide was used to generate the foam.

C. Compressed Gas

Three types of compressed gas were used to generate the foam: compressed air, carbon dioxide, and a gas used to simulate flue gas from a coal burning electric power plant. Dry air at sea level typically contains, among other things, 75.53 wt. % nitrogen, 23.16 wt. % oxygen and 0.033 wt. % carbon dioxide. The simulated flue gas consisted of a mixture of carbon dioxide, sulfur dioxide, nitrogen, and nitrous oxide. The carbon dioxide concentration in the simulated flue gas was 11.7%.

D. Foam Generator

The foam generator was a Mini (½") Open Air-Foam-Generating System (MiniOAS) manufactured by Elastizell that included a regulator, diaphragm pump, and foam mixing nozzle. Two pressure regulators were used for the compressed gas supply, one at the compressed gas tank, and the second at the foam generator. Gas from the tank was regulated to a pressure of 175 psi prior to introduction in the foam generator. When using carbon dioxide, a rubber hose extension, approximately six feet long, was used to warm the carbon dioxide gas before introduction into the foam generator. Without the additional length of hose, the foam generator began to freeze and leak gas.

The regulator on the foam generator was adjusted to 100 psi. The intake hose from the diaphragm pump was placed in the foam concentrate solution which was diluted using the ratio specified by the manufacturer of 40 parts of water to one part of foam concentrate by volume. The valve on the foam nozzle was opened and foam was generated until it reached a uniform quality (within approximately 5 to 10 seconds). The valve on the nozzle was then closed until foam was to be added to the CLSM mixture.

Foam density tests were performed for each of the three compressed gases used in foam production. The foam generator was started and flushed with clear water and then switched over to the 1 to 40 foaming agent to water mixture. The foam generator was re-started, and once a consistent stream was being produced, the foam was directed to fill a series of five-gallon pails. Each five-gallon pail was weighed and divided by its measured volume to arrive at the foam density values shown in Table 5. The stability of the foam produced with air and flue gas was excellent; however, the foam produced with the $CO_2$ decreased in volume linearly with time as shown in Table 6.

TABLE 5

Foam Density

| Gas Type | Foam Temp. (Degrees F.) | Weight (lb) (per 5-gal Pail) | Avg. Wt. (lb) (per 5 gal Pail) | Density (lb/cu ft) |
|---|---|---|---|---|
| | 60 | 1.76 | | |
| Air (First Run) | 60 | 1.76 | 1.77 | 2.65 |
| | 60 | 1.78 | | |
| | 65 | 1.82 | | |
| Air (Second Run) | 65 | 1.88 | 1.78 | 2.66 |
| | 65 | 1.64 | | |
| | 45 | 2.20 | | |
| Flue Gas (First Run) | 45 | 2.30 | 2.22 | 3.24 |
| | 45 | 2.16 | | |
| | 48 | 2.36 | | |
| Flue Gas (Second Run) | 48 | 2.44 | 2.47 | 3.70 |
| | 48 | 2.60 | | |
| | 60 | 2.93 | | |
| $CO_2$ (First Run) | 60 | 3.02 | 3.02 | 4.52 |
| | 60 | 3.12 | | |
| | 100 | 2.52 | | |
| $CO_2$ (Second Run) | 100 | 2.82 | 2.79 | 4.17 |
| | 95 | 3.04 | | |
| | 90 | 2.76 | | |
| $CO_2$ (First Run) w/Heater | 90 | 2.82 | 2.87 | 4.29 |
| | 92 | 3.04 | | |
| | 95 | 2.96 | | |
| $CO_2$ (First Run) w/Heater | 95 | 2.62 | 2.77 | 4.14 |
| | 95 | 2.74 | | |

TABLE 6

$CO_2$ Foam Loss versus Time

| Time (minutes) | Foam Height (in) | Foam Loss (in) | Loss (in/min) |
|---|---|---|---|
| 0 | 14.75 | — | — |
| 1 | 13.50 | −1.25 | 1.25 |
| 2 | 12.25 | −2.50 | 1.25 |
| 3 | 11.00 | −3.75 | 1.25 |
| 4 | 10.25 | −4.50 | 0.75 |
| 5 | 8.75 | −6.00 | 1.50 |
| Average | | | 1.20 |

It was believed that the foam loss for the $CO_2$ foam may be related to the cold temperature associated with the expanding compressed $CO_2$ gas. Two measures were employed to produce a stable-foam. Warm water was used with the foam concentrate and a heater-line was wrapped to help warm the $CO_2$ gas while being transported from the compressed air tank to the foam generator. The temperature of foam produced ranged from 60° F. (16° C.) up to 100° F. (38° C.). These improvements were successful in producing a stable-foam.

3. Manufacturing of CLSM Mixtures

CLSM was mixed using a two-cubic foot (0.057 m³) capacity tilting drum Gilson concrete rotating-drum mixer. All CLSM ingredients were manually weighed and loaded in the mixer. The required amounts of the cement-kiln dust, lime-kiln dust, or slag cement and water were loaded into the mixer and mixed for three minutes. If during the mixing process, the cementitious material agglomerated and adhered to the inside surface of the mixer, the mixer was briefly stopped, material was scraped from the mixer surface and then restarted for the remaining time. The desired volume of the foam was then added to the CLSM with the mixer running. The amount of foam was specified as a volume for each mixture. When the foam had uniformly mixed into the CLSM, the CLSM was discharged into a container of known volume for tests of unit weight, density and temperature. Each final mixture was them poured into a minimum of twenty four 4 in.×8 in. cylinder molds (pre-split for easy sample removal and for reuse) for casting of test specimens.

4. CLSM Specimen Preparation and Testing 4-inch diameter by 8-inch long cylindrical test specimens were prepared from each final mixture for compressive strength (ASTM D 4832) and carbonation testing (RILEM CPC18). Compressive strengths of the final CLSM mixtures were evaluated at the specified ages of 7, 14, 28, 56, 91, and 182 days. All test specimens were cast in accordance with ASTM D 4832. Three CLSM test specimens were tested at each test age for each of the nine test mixture materials (three by-products and three types of gases), and an average compressive strength was obtained for each test mixture.

All of the test specimens were allowed to cure in molds together for three days indoors in the laboratory where they were made. The plastic cylinder molds were then removed from the test specimens and they were moved to a curing chamber and subjected to roughly a 0.03% $CO_2$ concentration found in the ambient air, with the lab temperature of 20° C.+/−2° C. (70° F.+/−3° F.), and relative humidity of 65%+/−25%. A humidifier was used to add moisture to the curing chamber air during storage when the indoor air was dry in the room where the curing chamber was located. The cylinders were spaced at least 0.8 in (20 mm) apart in the curing chamber so that air was able to reach the test surfaces unhindered at all times and continued carbonation could take place. The specimens were kept in the curing chamber until needed for strength and carbonation testing.

5. Carbonation Evaluation

Depth of Carbonation and Percent by Mass $CO_2$

In order to evaluate the effects of the different mixtures used in the foamed CLSM, carbonation of the mixtures was first tested in accordance with RILEM test procedure CPC18, Measurement of Hardened Concrete Carbonation Depth (Materials and Structures, Vol. 21, No. 126, November-December 1988). In accordance with this test procedure, a phenolphthalein indicator solution is sprayed onto a broken section of test cylinder. A solution of 1% phenolphthalein in 70% ethyl alcohol was used. The cylinders used for the carbonation measurement were first tested for splitting-tensile strength. The broken surface of the cylinder was lightly brushed (with a horse-hair brush to avoid damaging the surface of the CLSM) to remove loose particles, and then sprayed with the indicator solution. Typically, the indicator solution was applied approximately two to three minutes after completion of the test for splitting-tensile strength. Carbonated areas of the test specimens remain colorless, while non-carbonated areas turn pinkish-red. Measurements for the depth of carbonation were taken after one to two minutes of application of the indicator solution.

A percent $CO_2$ by mass test was then performed on the samples. In contrast to the phenolphthalein indicator tests intended to record the depth of carbonation at points in time, the percent $CO_2$ by mass tests are intended to record the mass percentage of $CO_2$ embodied within the full-depth of the carbonated zone as indicated by the phenolphthalein indicator test at these same points in time. A portion of the carbonated cylinder (as determined from the phenolphthalein indicator test), from each type of mortar material, was sealed in a plastic food-grade bag for testing per ASTM C 25, "Standard Test Method for Chemical Analysis of Limestone, Quicklime, and Hydrated Lime," for carbon dioxide content. Immediately after compression testing and carbonation testing, samples were vacuum-sealed in the plastic bags. At the time of testing for $CO_2$ percent by mass, the carbonated portion of the samples were removed from the vacuum sealed bags. The samples were filed to the full depth of carbonation, and the filings were collected for further preparation by grinding in a mortar and pestle.

The ASTM C 25 gravimetric test method was used for quantifying the amount of carbon dioxide contained within each sample. The samples were decomposed with hydrochloric acid and the liberated $CO_2$ was passed through a series of scrubbers to remove water and sulfides. The $CO_2$ was absorbed with Ascarite, a special sodium hydroxide absorbent, and the gain in weight of the absorption tube was determined and calculated as percent $CO_2$.

6. Mixture Proportions

A. CLSM Trial Mixture Proportions

A small batch in a 0.15 ft³ (4248 cm³) mixing bowl was produced for each of the three by-product materials with compressed-air generated foam to obtain an indication of behavior with the foaming agent and the need for a retarding admixture in case of rapid setting. Each material was unique in its behavior with foam and affinity for water. Air content of the mixture was targeted at 30% for all these mixtures. Table 7 shows the actual proportions used for the small-scale trial batch mixtures.

TABLE 7

Actual Mixture Proportions for Small-Scale Trail Batch Mixtures

| Mixture (Material - Gas) | By-Product Material (lb/yd³) | Water (lb/yd³) | Air Content (%) |
| --- | --- | --- | --- |
| CKD - A | 1432 | 1100 | 6.2 |
| LKD - A | 1498 | 626 | 31.1 |
| SLG - A | 1331 | 548 | 40.9 |

The resulting densities and percent air contents for each mixture are shown in Table 8. These results were used to determine final mixture proportions for each of the by-product materials, as each by-product material had different water demands and behaved differently with the foaming agent. The targeted dry density needed to fall in the range of 60 to 90 pounds per cubic foot (962 to 1443 kg/m³) to provide lower density properties when compared to normal aggregates with densities over 100 pounds per cubic foot (1604 kg/m³).

TABLE 8

Density of Small-Scale Mixtures

| Material | Wet Density (lb/ft³), immediately after mixing | Air Dry Density (lb/ft³) (after 28 days) | Percent Air (Wet), immediately after mixing |
| --- | --- | --- | --- |
| CKD | 94.7 | 88.3 | 6.2 |
| LKD | 79.4 | 73.6 | 31.1 |
| Slag | 72.7 | 65.1 | 40.9 |

B. CLSM Final Mixtures Proportions

CLSM final mixture proportions and fresh properties for the foamed-CLSM mixtures are given in Table 9, which shows the amount of ingredients used for each 1.8 cu ft (0.051 cu m) batch of foamed mortar produced. The wet cylinder weight was targeted at 4.8 pounds+/− one pound (2.2 kg+/− 0.45 kg) for consistency of density. Additional quantities of carbon dioxide based foam were required to obtain the desired range of density due to the instability of the foam after formation. This can be readily identified on Table 9 when the amounts of foam used in mixtures with $CO_2$ (CKD+$CO_2$, etc.) are compared to the amounts of foam used for the compressed air and flue gas based foam mixtures (CKD+Air and CKD+Flue Gas, etc.) for each by-product set of mixtures.

TABLE 9

Mixture Proportions and Fresh Mortar Data for 1.8 ft³ Batches

|  | CKD + Air | CKD + Flue Gas | CKD + CO₂ | LKD + Air | LKD + Flue Gas | LKD + CO₂ | Slag + Air | Slag + Flue Gas | Slag + CO₂ |
|---|---|---|---|---|---|---|---|---|---|
| By-product (lb) | 85 | 85 | 83.2 | 105 | 105 | 105 | 107 | 107 | 107 |
| Foam (gallon) | 3 | 4 | 25 | 6 | 4 | 15 | 6.5 | 7 | 15 |
| Water (lb) | 64 | 64 | 64 | 44 | 44 | 44 | 43 | 43 | 43 |
| Retarder (ml) | 0 | 0 | 0 | 0 | 0 | 0 | 0 | 0 | 0 |
| Class C Fly Ash (lb) | 0 | 0 | 0 | 0 | 0 | 0 | 0 | 0 | 0 |
| Flow (in) | 10 | 11 | 14 | 9 | 11.5 | 19 | 7.5 | 7 | 14 |
| Temperature Rise (° F.) | 34 | 37 | 32 | 20 | 13 | 20 | 10 | 9 | 10 |
| Wet Cylinder Weight (lb) | 4.8 | 4.7 | 5.2 | 4.0 | 5.0 | 5.7 | 4.9 | 4.9 | 4.9 |

7. Mechanical Properties

A. CLSM Compressive Strength

CLSM has a maximum compressive strength specified by ACI Committee 229 as 1,200 psi at the age of 28 days. A desirable compressive strength level of CLSM at the 28-day age, for applications where the CLSM is used as a fill material and required to be removed at a later age, by the use of hand shovels, is usually specified to be less than 100 psi.

The by-product-based materials tested are low-strength compared to concrete and fall in the range of CLSM, with a required compressive strength of 1200 psi (8.3 MPa) or less. Table 10 provides the compressive strength test data obtained for the cement-kiln dust mixtures. All three of the CKD mixtures attained strength of at least 200 psi (1.38 MPa) by the 56-day age. At the conclusion of testing at the 182-day age the strength varied to a range of 209 to 217 psi (1.44 to 1.50 MPa) at the 182-day age.

TABLE 10

Average Compressive Strength Test Results for the CKD Mixtures

| | MIXTURE | | |
|---|---|---|---|
| Age (Days) | CKD + Air (psi) | CKD + Flue Gas (psi) | CKD + CO₂ (psi) |
| 7 | 49 | 55 | 37 |
| 14 | 167 | 123 | 128 |
| 28 | 234 | 178 | 241 |
| 56 | 207 | 232 | 279 |
| 91 | 297 | 240 | 282 |
| 182 | 216 | 209 | 217 |

Table 11 provides the compressive strength test data obtained for the lime-kiln dust mixtures. The LKD mixtures produced with compressed CO₂ gas provided the highest strength of 623 psi (4.30 MPa) at the 56-day age, followed by the flue gas mixture with a strength of 182 psi (1.26 MPa) and the compressed air mixture was lowest with 84 psi (0.59 MPa). The same strength pattern occurred at the later ages with no significant strength gain.

TABLE 11

Average Compressive Strength Test Results for the LKD Mixtures

| | MIXTURE | | |
|---|---|---|---|
| Age (Days) | LKD + Air (psi) | LKD + Flue Gas (psi) | LKD + CO₂ (psi) |
| 7 | 24 | 33 | 64 |
| 14 | 73 | 125 | 197 |
| 28 | 123 | 190 | 294 |
| 56 | 84 | 182 | 623 |
| 91 | 130 | 265 | 366 |
| 182 | 54 | 163 | 591 |

Table 12 provides the compressive strength test data for the slag mixtures. The slag mixture produced with compressed flue gas provided the highest strength at the 56-day age of 206 psi (1.42 MPa), followed by the CO₂ gas mixture with a strength of 193 psi (1.33 MPa), and the compressed air mixture was lowest at 91 psi (0.63 MPa) at the 56-day age. At the 91-day test age the slag based mixture produced with compressed CO₂ had the highest strength of 253 psi (1.74 MPa) followed by the flue gas mixture with 206 psi (1.42 MPa), and finally the compressed air mixture with 162 psi (1.12 MPa). At the 182-day age the compressed air mixture provided the highest compressive strength at 173 psi (1.19 MPa) followed by the CO₂ mixture with a compressive strength of 169 psi (1.17 MPa) and the flue gas mixture provided a strength of 131 psi (0.90 MPa).

TABLE 12

Average Compressive Strength Test Results for the Slag Mixtures

| | MIXTURE | | |
|---|---|---|---|
| Age (Days) | Slag + Air (psi) | Slag + Flue Gas (psi) | Slag + CO₂ (psi) |
| 7 | 105 | 181 | 109 |
| 14 | 141 | 182 | 130 |
| 28 | 100 | 212 | 238 |
| 56 | 91 | 206 | 193 |
| 91 | 162 | 206 | 253 |
| 182 | 173 | 131 | 169 |

A review of the compressive strength results for the mixtures produced with compressed air shows that the CKD mixture clearly concluded the tests with the highest compressive strength of 216 psi (1.49 MPa) followed by the slag mixture at 173 psi (1.19 MPa). The compressive strength of the LKD by-product material was below 54 psi (0.52 MPa), well below the strengths of the CKD and slag mixtures.

A review of the compressive strength results for the mixtures produced with the compressed flue gas shows that the CKD, LKD and slag mixtures concluded in relative proximity to each other at 209 psi (1.44 MPa), 163 psi (1.12 MPa) and 131 psi (0.90 MPa) respectively.

A review of the compressive strength test results for the mixtures produced with the compressed $CO_2$ gas shows that the LKD mixture clearly concluded the tests with the highest compressive strength of 591 psi (4.08 MPa). The CKD and slag mixtures concluded in relative proximity to each other at 217 psi (1.50 MPa) and 169 psi (1.17 MPa) respectively.

In summary, the compressive strengths were all comparable for the three CKD materials produced at all ages tested. The compressive strength of LKD was highest for the compressed $CO_2$ mixture followed by flue gas and then the air mixture. The compressive strengths of the three slag materials produced were comparable at all ages.

8. Carbonation Testing

A. Depth of Carbonation of CLSM Mixtures

The carbonated depth measurements at different ages for the cement-kiln dust mixtures are given in Table 13. The test results for carbonation depth measurements on the CKD materials show an expected near-linear increase with respect to time. The CKD materials foamed with air and flue gas carbonated at nearly the same rate from an age of one week to six months. The CKD material foamed with $CO_2$ also shows a linear increase in carbonation depth with no carbonation recorded at the seven day age and concluding at a measured carbonation depth of 0.875 in (22 mm) at the six month age. This compares to a depth of one inch (25 mm) for the materials foamed with air and flue gas at the six month age. This small difference may relate to the $CO_2$ based foam stability in the fresh mixtures, and possible variability in permeability providing a more difficult pathway for interaction with the curing atmosphere in the $CO_2$ based foam.

If the hardened foamed material were crushed into a ¾ inch (19 mm) aggregate at an early age, and if carbonation occurred inward from outside edges at a similar rate to these cylinders, the aggregate would achieve full-carbonation within 56 days of storage for all three types of the gases used. Similarly, full-carbonation of a one inch (25 mm) nominal size aggregate could be accomplished in 91 days.

TABLE 13

Carbonation Depth for Hardened CKD Materials

| CKD (Days) | Air (in) | Flue Gas (in) | $CO_2$ (in) |
|---|---|---|---|
| 7 | 0.03125 | 0.06250 | 0 |
| 14 | 0.12500 | 0.12500 | 0.12500 |
| 28 | 0.25000 | 0.25000 | 0.12500 |
| 56 | 0.40625 | 0.43750 | 0.37500 |
| 91 | 0.62500 | 0.62500 | 0.50000 |
| 182 | 1.00000 | 1.00000 | 0.87500 |

The carbonation depth at different ages of the lime-kiln dust mixtures are shown on Table 14 with the various $CO_2$ containing gases used in production. The test results for carbonation depth measurements on the LKD materials indicate a slow start of carbonation through the seven day age and then the expected near-linear increase in carbonation depth with respect to time. The LKD material foamed with air carbonated to the greatest depth after six months at 1.25 in (32 mm) followed by the material foamed with flue gas with a carbonation depth of 0.75 in (19 mm) and then the material foamed with $CO_2$ with a depth of 0.625 in (16 mm). The LKD material foamed with air was carbonated to a depth 67% greater than the material foamed with flue gas and 100% greater than the material foamed with $CO_2$ gas at the six month age. The carbonation differences may be related to permeability differences between the three samples foamed with the different gases. The foaming agent used in these tests is designed for use with compressed air. The introduction of flue gas and $CO_2$ gas may influence the size and spacing of air bubbles in the carbonated material, possibly affecting the materials' permeability and the ability of the curing atmosphere to reach the carbonation sites.

If the hardened foamed material were crushed into a ¾ inch (19 mm) aggregate at an early age, and carbonation occurred inward from outside edges similar to the cylinders tested, the aggregate would achieve carbonation within 56 days of storage for all three gases used. Similarly, carbonation of a one inch (25 mm) nominal size aggregate could be accomplished in 91 days.

TABLE 14

Carbonation Depth for Hardened LKD Materials

| LKD (Days) | Air (in) | Flue Gas (in) | $CO_2$ (in) |
|---|---|---|---|
| 7 | 0.00000 | 0.00000 | 0.00000 |
| 14 | 0.21875 | 0.12500 | 0.06250 |
| 28 | 0.31250 | 0.56250 | 0.18750 |
| 56 | 0.50000 | 0.50000 | 0.37500 |
| 91 | 0.93750 | 0.50000 | 0.62500 |
| 182 | 1.25000 | 0.75000 | 0.62500 |

The carbonation depth at different ages of the slag mixtures produced are shown on Table 15 with the various $CO_2$ containing gases used in production. The measurements for carbonation depth on the slag materials indicate an expected near-linear increase with respect to time. The phenolphthalein indicator test indicated that at the seven day age, no carbonation had occurred with slag materials foamed with $CO_2$, but the slag material foamed with air showed a carbonation depth of 0.03125 in (0.8 mm) and the material foamed with flue gas showed a depth of 0.0625 in (1.6 mm). At 14 days, all three slag based materials had a carbonation depth of 0.125 in (3.2 mm). At 28 days, the slag based materials foamed with air and flue gas each measured a depth of 0.25 in (6.4 mm), and the slag material foamed with $CO_2$ showed a carbonation depth of 0.125 in (3.2 mm). At 56 days the carbonation depth of slag material foamed with flue gas measured 0.4375 in (11 mm) followed by the slag material foamed with air at 0.40625 in (10 mm) and 0.375 in for the material foamed with $CO_2$. At 91 days, the slag material foamed with air showed a carbonation depth of 1.0 in (25 mm), the material foamed with flue gas showed a carbonation depth of 0.625 in (16 mm). The material foamed with $CO_2$ measured 0.50 in (13 mm) at both the 91 day and six month ages. At the six month age, the slag material foamed with air showed a carbonation depth of 1.25 in (32 mm) and the material foamed with flue gas showed a carbonation depth of 1.50 in (38 mm). The carbonation differences may be related to permeability variations between the three samples foamed with the different gases.

If the hardened foamed material were crushed into a ¾ inch (19 mm) aggregate at an early age, and carbonation occurred inward from outside edges similar to the cylinders tested, the aggregate would achieve carbonation within 56 days of storage for all three gases used. Similarly, carbonation of up to a two inch (51 mm) nominal size aggregate could be accomplished with compressed air and up to a one inch (25 mm) nominal size aggregate could be accomplished with flue gas and $CO_2$ gases in 91 days.

TABLE 15

Carbonation Depth for Hardened Slag Materials

| Slag (Days) | Air (in) | Flue Gas (in) | $CO_2$ (in) |
|---|---|---|---|
| 7 | 0.12500 | 0.06250 | 0.12500 |
| 14 | 0.25000 | 0.25000 | 0.12500 |
| 28 | 0.56250 | 0.25000 | 0.18750 |
| 56 | 0.75000 | 0.40625 | 0.37500 |
| 91 | 1.00000 | 0.62500 | 0.50000 |
| 182 | 1.25000 | 1.50000 | 0.50000 |

A review of the data shows that all of the compressed gases used (air, flue gas, or carbon dioxide) in the production of the foam based CLSM had similar effects on the rate of carbonation for each of the specific by-product-based materials tested. It appear that the chemical make-up of the by-product-based materials had a greater influence on the rate of carbonation than the concentration of $CO_2$ in the various compressed gases used.

B. $CO_2$ Percent by Mass of CLSM Mixtures

Table 16 provides the results of ASTM C 25, "Standard Test Method for Chemical Analysis of Limestone, Quicklime, and Hydrated Lime," gravimetric testing method for $CO_2$ by mass for the cement-kiln dust based materials. The $CO_2$ content determined for CKD at an age of zero days represents the mass percentage of $CO_2$ in a sample of the raw material, before it was used in production of the foamed CLSM. The CKD was provided by Lafarge North America from the cement manufacturing facility located in Alpena, Mich. All other values given in Table 16 are from the carbonated portion of the cured cylinders and are the values obtained from ASTM C 25 testing of the CKD based materials formed with the gases shown. The CKD powder originally contained 9.5% $CO_2$ by mass. This amount increased after 182 days to 20.7%, 21.0% and 19.2% for the CKD based materials foamed with compressed air, flue gas and $CO_2$ respectively.

TABLE 16

Percent $CO_2$ by Mass of CKD-Based Carbonated Materials

| Time (Days) | Air (% $CO_2$) | Flue Gas (% $CO_2$) | $CO_2$ (% $CO_2$) |
|---|---|---|---|
| 0 | 9.5 | — | — |
| 7 | 21.8 | 18.1 | 7.0 |
| 14 | 18.3 | 17.2 | 16.7 |
| 28 | 19.1 | 18.8 | 19.4 |
| 56 | 19.9 | 21.0 | 18.9 |
| 91 | 20.2 | 20.2 | 18.2 |
| 182 | 20.7 | 21.0 | 19.2 |

Table 17 provides the results of the ASTM C 25, "Standard Test Method for Chemical Analysis of Limestone, Quicklime, and Hydrated Lime," gravimetric testing method used for the determination of $CO_2$ by mass from the lime-kiln dust based materials. The $CO_2$ content determined for LKD at an age of zero days represents the mass percentage of $CO_2$ in a sample of the raw material before it was used in production of the foamed CLSM. The LKD was provided by Western Lime Corporation from the lime manufacturing facility located in Eden, Wis. All other values given in Table 17 are from the carbonated portion of the cured cylinders, and are the values obtained from ASTM C 25 testing of the LKD based materials formed with the gases shown. The original LKD powder contained 22.2% $CO_2$ by mass. This amount increased after 182 days to 25.9%, 25.7% and 25.6% of the mass for the LKD-based materials foamed with compressed air, flue gas, and $CO_2$ respectively.

TABLE 17

Percent by Mass $CO_2$ of LKD-Based Carbonated Materials

| Time (Days) | Air (% $CO_2$) | Flue Gas (% $CO_2$) | $CO_2$ (% $CO_2$) |
|---|---|---|---|
| 0 | 22.2 | — | — |
| 7 | 20.7 | 21.8 | 20.9 |
| 14 | 23.3 | 23.7 | 24.7 |
| 28 | 24.0 | 22.7 | 24.6 |
| 56 | 24.8 | 25.0 | 24.6 |
| 91 | 25.0 | 25.3 | 24.8 |
| 182 | 25.9 | 25.7 | 25.6 |

Table 18 provides the results of the ASTM C 25, "Standard Test Method for Chemical Analysis of Limestone, Quicklime, and Hydrated Lime," gravimetric testing method used for the determination of $CO_2$ by mass from the slag based materials. The $CO_2$ content determined for the slag at an age of zero days represents the mass-percentage of $CO_2$ in a sample of the raw material before it was used in production of the foamed CLSM. The slag was provided by Holcim (US) Inc. from the slag manufacturing facility located in Chicago, Ill. All other values given in Table 18 are from the carbonated portion of the cured cylinders, and are the values obtained from ASTM C 25 testing of the slag based materials formed with the gases shown. The original slag contained 1.4% $CO_2$ by mass. This amount increased after 182 days to 5.2%, 5.1% and 4.7% of the mass for the slag-based materials foamed with compressed air, flue gas and $CO_2$ respectively.

TABLE 18

Percent by Mass $CO_2$ of Slag-Based Carbonated Materials

| Time (Days) | Air (% $CO_2$) | Flue Gas (% $CO_2$) | $CO_2$ (% $CO_2$) |
|---|---|---|---|
| 0 | 1.4 | — | — |
| 7 | 2.5 | 7.2 | 1.8 |
| 14 | 5.1 | 4.0 | 4.1 |
| 28 | 3.2 | 4.5 | 5.2 |
| 56 | 3.8 | 4.5 | 5.3 |
| 91 | 7.3 | 5.0 | 5.2 |
| 182 | 5.2 | 5.1 | 4.7 |

For the three by-product-based materials made with compressed air, there was a net increase in the measured $CO_2$ content by percent mass in each case. The $CO_2$ content of the CKD-based materials more than doubled from a starting value of 9.5% to 20.7% after six months and the percent $CO_2$ content by mass times volume also increased. The $CO_2$ content of the LKD-based materials increased modestly from a starting value of 22.2% to 25.9% after six months and the percent $CO_2$ content by mass times volume also increased.

The slag-based material had a starting value of 1.4% and increased by nearly four times to 5.2% after six months, and the percent $CO_2$ content by mass times volume also increased.

For the three by-product-based materials made using compressed flue gas, there was also a net increase in the measured $CO_2$ content over time in each case. The $CO_2$ content of the CKD-based materials more than doubled from a starting value of 9.5% to 21.0% after six months, and the percent $CO_2$ content by mass times volume also increased. The $CO_2$ content of the LKD-based materials increased modestly from a starting value of 22.2% to 25.7% after six months, and the percent $CO_2$ content by mass times volume also increased. The slag had a starting value of 1.4% and increased by over three times to 5.1% after six months, and the percent $CO_2$ content by mass times volume also increased.

Finally, the three by-product-based materials made using compressed carbon dioxide gas also showed a net increase in the measured value of $CO_2$ in each case. The $CO_2$ content of the CKD-based materials nearly doubled from a starting value of 9.5% to 19.2% after six months, and the percent $CO_2$ content by mass times volume also increased. The measured value of $CO_2$ content of the LKD-based materials increased modestly from a starting value of 22.2% to 25.6% after six months, and the percent $CO_2$ content by mass times volume also increased. The slag-based material had a measured $CO_2$ starting value of 1.4% and increased to 4.7% after six months, and the percent $CO_2$ content by mass times volume also increased.

These results illustrate that for all of the $CO_2$ containing compressed gases used, the by-product materials have significant $CO_2$ sequestration properties. For all of the $CO_2$ containing gases used, the total amount of $CO_2$ sequestered was highest in the LKD aggregates, followed by the CKD and Slag aggregates.

9. Measured Properties for Foamed-CLSM Aggregates

For the purposes of illustration only, Tables 19-20 provide properties for the materials prepared above from cement-kiln dust, lime-kiln dust, and slag cement in relation to American Society for Testing and Materials (ASTM) specifications and properties of other materials. Each of the nine materials created above (three different by-products each combined with three different gases) were crushed into aggregates. The crushed aggregate materials were tested for characteristics that would allow for comparison to other materials.

Table 19 shows test results for the measurement of five different physical properties for the crushed aggregates made from the by-product based CLSM: bulk density in a dry-rodded state (density), absorption, specific gravity, fineness modulus, and staining test results.

The bulk density in a dry-rodded state is defined in ASTM C 29, "Standard Test Method for Bulk Density (Unit Weight) and Voids in Concrete," as "the mass of a unit volume of bulk aggregate material, in which the volume includes the volume of the individual particles and the volume of the voids between the particles." The bulk density relationship is important for planning packaging and transportation commercial arrangements. The density compared to other materials is also helpful in planning geotechnical and concrete product applications. The dry-rodded bulk densities for the by-product-based aggregates fall in the range of 44.2 to 61.8 $lb/ft^3$.

Absorption is defined in ASTM C 127, "Standard Test Method for Density, Relative Density (Specific Gravity), and Absorption of Coarse Aggregate," as "the increase in mass of aggregate due to water penetration into the pores of the particles during a prescribed period of time, but not including water adhering to the outside surface of the particles, expressed as a percentage of dry mass." The aggregates were soaked in water for 24 hours (plus or minus 4 hours) and then dried in towels to the saturated surface dry (SSD) condition. The absorption values ranged from a low value of 18.1 percent for the slag foamed with $CO_2$ aggregate material to a high of 48.7 for the CKD foamed with $CO_2$ aggregate material. The absorption property is important in calculating the change in density from a dry to SSD condition for storage, packaging and transportation purposes. Absorption is also an important property for performing water content calculations in concrete mixture proportioning, and in calculating internal curing potential for lightweight aggregate concrete.

Specific gravity is defined in ASTM C 127, "Standard Test Method for Density, Relative Density (Specific Gravity), and Absorption of Coarse Aggregate," as "the ratio of the density of the aggregate (oven dry) to the density of distilled water at a stated temperature" which in this case was 73° F. (23° C.). Specific gravity is commonly used for volume calculations in concrete, asphalt and other mixture proportioning purposes.

The fineness modulus property is defined in ASTM C 136, "Standard Test Method for Sieve Analysis of Fine and Coarse Aggregates," and calculated "by adding the total percentages of material in a sample that is coarser than each of the following sieves (cumulative percentages retained), and dividing the sum by 100: 150-μm (No. 100), 300-μm (No. 50), 600-μm (No. 30), 1.18-mm (No. 16), 2.36-mm (No. 8), 4.75-mm (No. 4), 9.5-mm (⅜-in.), 19.0-mm (¾-in.), 37.5-mm (1½-in.) and larger increasing in the ratio of 2:1." In this study, the sieves conclude at 19.0-mm (¾-in.) because this was the planned top-size of the aggregates. The fineness modulus property is used primarily as an indication of aggregate relative fineness or coarseness. The higher the fineness modulus value, the coarser the aggregate. Fineness modulus ranged from a low of 4.15 for LKD with air based aggregate to a high of 6.42 for the Slag with air based aggregate.

The staining test, defined by ASTM C 641, "Standard Test Method for Iron Staining Materials in Lightweight Concrete Aggregates," provides a visual colorimetric method that was used to determine the iron staining potential of the nine by-product-based aggregates. The test involves selecting two-100 gm samples of aggregate with a specific gradation passing the ⅜ in (9.5 mm) sieve and retained on the No. 30 (600 μm) sieve. The sample is then placed at a uniform thickness on a white-filter paper that is then wrapped with cheesecloth. The wrapped sample was saturated in distilled water, and placed in a steam bath for 16 hours of continuous exposure. The sample was then removed from the filter paper, and the filter paper was oven dried on a watch glass. In this case, all of the samples tested had no staining with a rating of zero.

TABLE 19

Physical Properties of By-Product-Based Aggregates

| | Density ($lb/ft^3$) | Absorption (%) | Specific Gravity | Fineness Modulus | Staining |
|---|---|---|---|---|---|
| CKD + AIR | 46.6 | 41.6 | 0.99 | 4.98 | 0 |
| CKD + $CO_2$ | 45.2 | 48.7 | 1.01 | 4.82 | 0 |
| CKD + FG | 46.0 | 44.2 | 0.95 | 5.11 | 0 |

TABLE 19-continued

Physical Properties of By-Product-Based Aggregates

|  | Density (lb/ft³) | Absorption (%) | Specific Gravity | Fineness Modulus | Staining |
|---|---|---|---|---|---|
| LKD + AIR | 56.0 | 31.4 | 0.99 | 4.15 | 0 |
| LKD + $CO_2$ | 61.8 | 27.3 | 1.34 | 5.49 | 0 |
| LKD + FG | 48.8 | 25.7 | 1.20 | 5.17 | 0 |
| SLG + AIR | 44.1 | 33.0 | 1.24 | 6.42 | 0 |
| SLG + $CO_2$ | 49.8 | 18.1 | 1.54 | 6.37 | 0 |
| SLG + FG | 46.9 | 27.0 | 1.24 | 6.39 | 0 |

In Table 20, the by-product-based crushed aggregates range of values for the five physical properties are compared to published values for natural crushed gravel, two sources of pumice, and a source of manufactured expanded shale aggregate. The physical properties comparisons show that these aggregates are similar to expanded shale aggregates which fall in density below normal crushed gravel aggregate and just higher than pumice lightweight aggregate.

TABLE 20

Physical Properties Comparison of By-Product Mineral Based Aggregates to Commercial Materials

|  | Density (lb/ft³) | Absorption (%) | Specific Gravity | Fineness Modulus | Staining |
|---|---|---|---|---|---|
| Pumice | 55.0 | 16.3 | 1.20 | 3.10 | 0 |
| Volcanic Pumice | 37.0 | 32.1 | 0.76 | 2.55 | — |
| Expanded Shale | 54.0 | 18.0 | 1.73 | 3.88 | 0 |
| Crushed Gravel | 113.0 | 1.6 | 2.57 | 2.82 | — |
| Range for By-Product Aggregates Tested | 44.1-61.8 | 18.1-48.7 | 0.95-1.54 | 4.15-6.42 | 0 |

10. Actual and Potential Sequestration of Carbon Dioxide in the CLSM

Previously presented data illustrate that the foamed CLSM can sequester significant amounts of $CO_2$ gas. Table 21 shows the average net % $CO_2$ that was sequestered and stored for the three by-product based foamed CLSM during the 182-day course of the example studies. Net % $CO_2$ sequestered was calculated by subtracting the average starting % $CO_2$ by mass of each starting material from the % $CO_2$ by mass of the by-product based foamed CLSM after 182 days.

TABLE 21

Average $CO_2$ Sequestered by Percent Mass at 182 Day Age

| Material | Total % $CO_2$ by Mass at 182-Day Age | Starting % $CO_2$ by Mass at Day 0 | Net % $CO_2$ Sequestered |
|---|---|---|---|
| CKD | 20.3 | 9.5 | 10.8 |
| LKD | 25.7 | 22.2 | 3.5 |
| Slag | 5.0 | 1.4 | 3.6 |

Table 22 provides estimates based on the net % $CO_2$ sequestered values shown in Table 21 of the amount of $CO_2$ that the three by-product based foamed CLSM could potentially sequester, assuming that all of the three by-products produced in the United States were converted to the foamed CLSM of the present invention. In addition to what can be sequestered permanently in the mineral matrix of the CLSM, the process of the invention avoids $CO_2$ production. Natural lightweight aggregate requires a quarry operation. Fired lightweight aggregate requires fuel consumption and additional $CO_2$ emissions.

TABLE 22

Annual $CO_2$ Sequestration Potential of By-Product Mineral Aggregates

| By-Product Mineral Aggregate | Annual Production (tons) | % $CO_2$ by Mass | Annual $CO_2$ Sequestration Potential (tons) | Total $CO_2$ % by Mass in Aggregates | Total $CO_2$ Contained in Aggregates (tons) |
|---|---|---|---|---|---|
| CKD | 20,000,000 | 10.8 | 2,200,000 | 20.3 | 4,050,000 |
| LKD | 2,800,000 | 3.5 | 97,000 | 25.7 | 710,000 |
| Slag | 23,700,000 | 3.6 | 850,000 | 5.0 | 1,200,000 |
| Total | 46,500,000 | — | 3,147,000 | — | 5,940,000 |

Table 23 provides the data, calculations, and assumptions underlying another, more detailed estimate of the potential amount of $CO_2$ that could be sequestered by cement-kiln dust based foamed CLSM.

TABLE 23

| Cement Kiln Dust: Calcium Compound Reactions | | |
|---|---|---|
| Assumptions: | | |
| 49.76% by wt of Cement Kiln Dust (CKD) is "CaO" | | |
| 4.976% by wt of CKD is free CaO | 0.000887304 | mol CaO/1 g of CKD |
| 10% of "CaO" is free CaO (4.976%/49.76%) | | |
| molar weight of CaO = 56.08 g/mol | | |
| 50% of "CaO" is $2CaO*SiO_2$ | 0.002218260 | mol $2CaO*SiO_2$/1 g of CKD |
| 50% * .4976 g of "CaO" in $2CaO*SiO_2$ per 1 g of CKD | | |
| 2 moles of CaO per mol $2CaO*SiO_2$ | | |
| 30% of "CaO" is $3CaO*Al_2O_3$ | 0.000887304 | mol $3CaO*Al_2O_3$/1 g of CKD |
| 30% * .4976 g of "CaO" in $3CaO*Al_2O_3$ per 1 g of CKD | | |
| 3 moles of CaO per mol $3CaO*Al_2O_3$ | | |
| rest of "CaO" in forms that do not react to produce or consume $Ca(OH)_2$ | | |
| Rxns: (assume all are 90% complete) | | |
| $CaO + H_2O \rightarrow Ca(OH)_2$ | 0.000798573 | mol $Ca(OH)_2$ produced from CaO/1 g of CKD |
| $2(2CaO*SiO2) + 4H_2O \rightarrow 3CaO*2SiO_2*3H_2O + Ca(OH)_2$ | 0.000998217 | mol $Ca(OH)_2$ produced from $2CaO*SiO_2$/1 g of CKD |
| $3CaO*Al_2O_3 + 12H_2O + Ca(OH)_2 \rightarrow 3CaO*Al_2O_3*Ca(OH)_2*12H_2O$ | 0.000798573 | mol $Ca(OH)_2$ consumed by $3CaO*Al_2O_3$/1 g of CKD |
| $Ca(OH)_2 + CO_2 \rightarrow CaCO_3 + H_2O$ | 0.000898395 | mol $CO_2$ consumed/1 g of CKD |
| | 0.039538371 | g of $CO_2$ consumed/1 g of CKD |
| Cement Kiln Dust: Sodium Compound Reactions | | |
| Assumptions: | | |
| 0.9% by wt of Cement Kiln Dust (CKD) is "$Na_2O$" | | |
| 50% of "$Na_2O$" is $Na_2O_2$ | 7.26041E−05 | mol $Na_2O_2$/1 g of CKD |
| 50% * .009 g of "$Na_2O$" in $Na_2O_2$ per 1 g of CKD | | |
| 1 mol of $Na_2O$ per mol $Na_2O_2$ | | |
| molar weight $Na_2O$ = 61.98 g/mol | | |
| rest of "$Na_2O$" in forms that do not react to produce or consume $Ca(OH)_2$ | | |
| Rxns: (assume all are 90% complete) | | |
| $2Na_2O_2 + 2H_2O \rightarrow 4NaOH + O_2$ | 0.000130687 | mol NaOH produced/1 g of CKD |
| $NaOH + CO_2 \rightarrow NaHCO_3$ | 0.000117619 | mol $CO_2$ consumed/1 g of CKD |
| | 0.005176394 | g of $CO_2$ consumed/1 g of CKD |
| Cement Kiln Dust: Potassium Compound Reactions | | |
| Assumptions: | | |
| 3.8% by wt of Cement Kiln Dust (CKD) is "$K_2O$" | | |
| 30% of "$K_2O$" is $K_2O_2$ | 0.000121019 | mol $K_2O_2$/1 g of CKD |
| 30% * 0.038 g of "$K_2O$" in $K_2O_2$ per 1 g of CKD | | |
| 1 mol of $K_2O$ per mol $K_2O_2$ | | |
| molar weight $K_2O$ = 94.2 g/mol | | |
| 30% of "$K_2O$" is $KO_2$ | 0.000242038 | mol $KO_2$/1 g of CKD |
| 30% * .038 g of "$K_2O$" in $KO_2$ per 1 g CKD | | |
| 0.5 mol of $K_2O$ per mol $KO_2$ | | |
| molar weight $K_2O$ = 94.2 g/mol | | |
| rest of "$Na_2O$" in forms that do not react to produce or consume $Ca(OH)_2$ | | |
| Rxns: (assume all are 90% complete) | | |
| $2K_2O_2 + 4H_2O \rightarrow 4KOH + O_2$ | 0.000217834 | mol KOH produced/1 g of CKD |
| $4KO_2 + 2H_2O \rightarrow 4KOH + 3O_2$ | 0.000217834 | mol KOH produced/1 g of CKD |

TABLE 23-continued

| | | |
|---|---|---|
| $2KOH + CO_2 \rightarrow K_2CO_3 + H_2O$ | 0.000196051 | mol $CO_2$ consumed/1 g of CKD |
| | 0.008628203 | g of $CO_2$ consumed/1 g CKD |

Cement Kiln Dust: Magnesium Compound Reactions

Assumptions:

2.23% by wt of Cement Kiln Dust (CKD) is "MgO"
50% of "MgO" is available as Mg                        0.000285289  mol Mg/1 g of CKD
50% * .023 g of "MgO" in Mg per 1 g of CKD
1 mol of MgO per mol Mg
molar weight MgO = 40.31 g/mol
rest of "MgO" in forms that do not react to
produce or consume $Ca(OH)_2$
Rxns: (assume all are 90% complete)

| | | |
|---|---|---|
| $Mg + 2H_2O \rightarrow Mg(OH)_2 + H_2$ | 0.000256760 | mol $Mg(OH)_2$ produced/1 g of CKD |
| $Mg(OH)_2 + CO_2 \rightarrow MgCO_3 + H_2O$ | 0.000231084 | mol $CO_2$ consumed/1 g of CKD |
| | 0.010170011 | g of $CO_2$ consumed/1 g of CKD |

Cement Kiln Dust: Total $CO_2$ Consumed (sequestered) in CLSM

| | |
|---|---|
| 0.040 | g of $CO_2$ consumed (sequestered)/g of CKD in Ca reactions |
| 0.005 | g of $CO_2$ consumed (sequestered)/g of CKD in Na reactions |
| 0.009 | g of $CO_2$ consumed (sequestered)/g of CKD in K reactions |
| 0.010 | g of $CO_2$ consumed (sequestered)/g of CKD in Mg reactions |
| 0.064 | g of $CO_2$ consumed (sequestered)/g of CKD TOTAL |

Assumptions:

| | |
|---|---|
| 1625 | lb of CKD/1 yd³ CLSM |
| | Sufficient $CO_2$ and $H_2O$ so that neither limit the reaction |
| 2225 | lb of CLSM/1 yd³ CLSM |
| 103 | lb of $CO_2$ consumed (sequestered)/yd³ of CLSM |
| 0.046 | lb of $CO_2$ consumed (sequestered)/lb of CLSM |

Annual sequestration estimate
Assumptions:

| | |
|---|---|
| 100000 | tons of CKD utilized for CLSM |
| 123000 | yd³ CLSM produced |
| 6350 | tons of $CO_2$ consumed (sequestered) annually |

Table 24 provides the data, calculations, and assumptions underlying another, more detailed estimate of the potential amount of $CO_2$ that could be sequestered by lime-kiln dust based foamed CLSM.

TABLE 24

Lime Kiln Dust: Calcium Compound Reactions

Assumptions:

32.69% by wt of Lime Kiln Dust (LKD) is "CaO"
3.27% by wt of LKD is free CaO                           0.000583096  mol CaO/1 g of LKD
10% of "CaO" is free CaO (3.27%/32.7%)
molar weight of CaO = 56.08 g/mol
50% of "CaO" is $2CaO*SiO_2$                             0.001457739  mol $2CaO*SiO_2$/1 g of LKD
50% * .327 g of "CaO" in $2CaO*SiO_2$ per 1 g of LKD
2 moles of CaO per mol $2CaO*SiO_2$
30% of "CaO" is $3CaO*Al_2O_3$                           0.000583096  mol $3CaO*Al_2O_3$/1 g of LKD
30% * .327 g of "CaO" in $3CaO*Al_2O_3$ per 1 g of LKD
3 moles of CaO per mol $3CaO*Al_2O_3$
rest of "CaO" in forms that do not react to
produce or consume $Ca(OH)_2$
Rxns: (assume all are 90% complete)

| | | |
|---|---|---|
| $CaO + H_2O \rightarrow Ca(OH)_2$ | 0.000524786 | mol $Ca(OH)_2$ produced from CaO/1 g of LKD |
| $2(2CaO*SiO_2) + 4H_2O \rightarrow 3CaO*2SiO_2*3H_2O + Ca(OH)_2$ | 0.000655983 | mol $Ca(OH)_2$ produced from $2CaO*SiO_2$/1 g of LKD |
| $3CaO*Al_2O_3 + 12H_2O + Ca(OH)_2 \rightarrow 3CaO*Al_2O_3*Ca(OH)_2*12H_2O$ | 0.000524786 | mol $Ca(OH)_2$ consumed by $3CaO*Al_2O_3$/1 g of LKD |

TABLE 24-continued

| | | |
|---|---|---|
| $Ca(OH)_2 + CO_2 \rightarrow CaCO_3 + H_2O$ | 0.000590384 | mol $CO_2$ consumed/1 g of LKD |
| | 0.025982812 | g of $CO_2$ consumed/1 g of LKD |

Lime Kiln Dust: Sodium Compound Reactions

Assumptions:

1.5% by wt of Lime Kiln Dust (LKD) is "$Na_2O$"
50% of "$Na_2O$" is $Na_2O_2$
50% * .015 g of "$Na_2O$" in $Na_2O_2$ per 1 g of LKD
1 mol of $Na_2O$ per mol $Na_2O_2$
molar weight $Na_2O$ = 61.98 g/mol
rest of "$Na_2O$" in forms that do not react to produce or consume $Ca(OH)_2$
Rxns: (assume all are 90% complete)

0.000121007 mol $Na_2O_2$/1 g of LKD

| | | |
|---|---|---|
| $2Na_2O_2 + 2H_2O \rightarrow 4NaOH + O_2$ | 0.000217812 | mol NaOH produced/1 g of LKD |
| $NaOH + CO_2 \rightarrow NaHCO_3$ | 0.000196031 | mol $CO_2$ consumed/1 g of LKD |
| | 0.008627323 | g of $CO_2$ consumed/1 g of LKD |

Lime Kiln Dust: Potassium Compound Reactions

Assumptions:

0.83% by wt of Lime Kiln Dust (LKD) is "$K_2O$"
30% of "$K_2O$" is $K_2O_2$
30% * .0083 g of "$K_2O$" in $K_2O_2$ per 1 g of LKD
1 mol of $K_2O$ per mol $K_2O_2$
molar weight $K_2O$ = 94.2 g/mol 2.64331E−05 mol $K_2O_2$/1 g of LKD 30% of "$K_2O$" is $KO_2$
30% * .0083 g of "$K_2O$" in $KO_2$ per 1 g of LKD
0.5 mol of $K_2O$ per mol $KO_2$
molar weight $K_2O$ = 94.2 g/mol
rest of "$Na_2O$" in forms that do not react to produce or consume $Ca(OH)_2$
Rxns: (assume all are 90% complete)

5.28662E−05 mol $KO_2$/1 g of LKD

| | | |
|---|---|---|
| $2K_2O_2 + 4H_2O \rightarrow 4KOH + O_2$ | 4.75796E−05 | mol KOH produced/1 g of LKD |
| $4KO_2 + 2H_2O \rightarrow 4KOH + 3O_2$ | 4.75796E−05 | mol KOH produced/1 g of LKD |
| $2KOH + CO_2 \rightarrow K_2CO_3 + H_2O$ | 4.28217E−05 | mol $CO_2$ consumed/1 g of LKD |
| | 0.001884581 | g of $CO_2$ consumed/1 g of LKD |

Lime Kiln Dust: Magnesium Compound Reactions

Assumptions:

24.9% by wt of Lime Kiln Dust (LKD) is "MgO"
50% of "MgO" is available as Mg
50% * .249 g of "MgO" in Mg per 1 g of LKD
1 mol of MgO per mol Mg
molar weight MgO = 40.31 g/mol
rest of "MgO" in forms that do not react to produce or consume $Ca(OH)_2$
Rxns: (assume all are 90% complete)

0.003088564 mol Mg/1 g of LKD

| | | |
|---|---|---|
| $Mg + 2H_2O \rightarrow Mg(OH)_2 + H_2$ | 0.002779707 | mol $Mg(OH)_2$ produced/1 g of LKD |
| $Mg(OH)_2 + CO_2 \rightarrow MgCO_3 + H_2O$ | 0.002501737 | mol $CO_2$ consumed/1 g of LKD |
| | 0.110101425 | g of $CO_2$ consumed/1 g of LKD |

Lime Kiln Dust: Total $CO_2$ Consumed (sequestered) in CLSM

| | |
|---|---|
| 0.026 | g of $CO_2$ consumed (sequestered)/g of LKD in Ca reactions |
| 0.009 | g of $CO_2$ consumed (sequestered)/g of LKD in Na reactions |
| 0.002 | g of $CO_2$ consumed (sequestered)/g of LKD in K reactions |
| 0.110 | g of $CO_2$ consumed (sequestered)/g of LKD in Mg reactions |
| 0.147 | g of $CO_2$ consumed (sequestered)/g of LKD TOTAL |

Assumptions:

| | |
|---|---|
| 1450 | lb of LKD/1 yd³ CLSM |
| | Sufficient $CO_2$ and $H_2O$ so that neither limit the reaction |
| 2050 | lb of CLSM/1 yd³ CLSM |
| 213 | lb of $CO_2$ consumed (sequestered)/yd³ of CLSM |
| 0.104 | lb of $CO_2$ consumed (sequestered)/lb of CLSM |

Annual sequestration estimate

Table 25 provides the data, calculations, and assumptions underlying another, more detailed estimate of the potential amount of $CO_2$ that could be sequestered by slag cement based foamed CLSM.

TABLE 25

Blast Furnace Slag: Calcium Compound Reactions

Assumptions:

38.15% by wt of Blast Furnace Slag (Slag) is "CaO"
3.8% by wt of Slag is free CaO     0.000677603   mol CaO/1 g of Slag
10% of "CaO" is free CaO (3.8%/38%)
molar weight of CaO = 56.08 g/mol
50% of "CaO" is $2CaO*SiO_2$     0.000169401   mol $2CaO*SiO_2$/1 g of Slag
50% * .038 g of "CaO" in $2CaO*SiO_2$ per 1 g of Slag
2 moles of CaO per mol $2CaO*SiO_2$
30% of "CaO" is $3CaO*Al_2O_3$     6.77603E−05   mol $3CaO*Al_2O_3$/1 g of Slag
30% * .038 g of "CaO" in $3CaO*Al_2O_3$ per 1 g of Slag
3 moles of CaO per mol $3CaO*Al_2O_3$
rest of "CaO" in forms that do not react to produce or consume $Ca(OH)_2$
Rxns: (assume all are 90% complete)

| Reaction | Value | Description |
|---|---|---|
| $CaO + H_2O \rightarrow Ca(OH)_2$ | 0.000609843 | mol $Ca(OH)_2$ produced from CaO/1 g of Slag |
| $2(2CaO*SiO_2) + 4H_2O \rightarrow 3CaO*2SiO_2*3H_2O + Ca(OH)_2$ | 7.62304E−05 | mol $Ca(OH)_2$ produced from $2CaO*SiO_2$/1 g of Slag |
| $3CaO*Al_2O_3 + 12H_2O + Ca(OH)_2 \rightarrow 3CaO*Al_2O_3*Ca(OH)_2*12H_2O$ | 6.09843E−05 | mol $Ca(OH)_2$ consumed by $3CaO*Al_2O_3$/1 g of Slag |
| $Ca(OH)_2 + CO_2 \rightarrow CaCO_3 + H_2O$ | 0.00056258 | mol $CO_2$ consumed/1 g of Slag |
| | 0.024759156 | g of $CO_2$ consumed/1 g of Slag |

Blast Furnace Slag: Sodium Compound Reactions

Assumptions:

0.0% by wt of Slag is "$Na_2O$"
50% of "$Na_2O$" is $Na_2O_2$     0   mol $Na_2O_2$/1 g of Slag
50% * .00 g of "$Na_2O$" in $Na_2O_2$ per 1 g of Slag
1 mol of $Na_2O$ per mol $Na_2O_2$
molar weight $Na_2O$ = 61.98 g/mol
rest of "$Na_2O$" in forms that do not react to produce or consume $Ca(OH)_2$
Rxns: (assume all are 90% complete)

| Reaction | Value | Description |
|---|---|---|
| $2Na_2O_2 + 2H_2O \rightarrow 4NaOH + O_2$ | 0 | mol NaOH produced/1 g of Slag |
| $NaOH + CO_2 \rightarrow NaHCO_3$ | 0 | mol $CO_2$ consumed/1 g of Slag |
| | 0 | g of $CO_2$ consumed/1 g of Slag |

Blast Furnace Slag: Potassium Compound Reactions

Assumptions:

0.35% by wt of Slag is "$K_2O$"
30% of "$K_2O$" is $K_2O_2$     1.11465E−05   mol $K_2O_2$/1 g of Slag
30% * .0035 g of "$K_2O$" in $K_2O_2$ per 1 g of Slag
1 mol of $K_2O$ per mol $K_2O_2$
molar weight $K_2O$ = 94.2 g/mol
30% of "$K_2O$" is $KO_2$     2.2293E−05   mol $KO_2$/1 g of Slag
30% * .0035 g of "$K_2O$" in $KO_2$ per 1 g of Slag
0.5 mol of $K_2O$ per mol $KO_2$
molar weight $K_2O$ = 94.2 g/mol
rest of "$Na_2O$" in forms that do not react to produce or consume $Ca(OH)_2$ TABLE 25-continued Rxns: (assume all are 90% complete)

| | | |
|---|---|---|
| $2K_2O_2 + 4H_2O \rightarrow 4KOH + O_2$ | 2.00637E-05 | mol KOH produced/1 g of Slag |
| $4KO_2 + 2H_2O \rightarrow 4KOH + 3O_2$ | 2.00637E-05 | mol KOH produced/1 g of Slag |
| $2KOH + CO_2 \rightarrow K_2CO_3 + H_2O$ | 1.80573E-05 | mol $CO_2$ consumed/1 g of Slag |
| | 0.000794703 | g of $CO_2$ consumed/1 g of Slag |

Blast Furnace Slag: Magnesium Compound Reactions

Assumptions:

11.02% by wt of Slag is "MgO"
50% of "MgO" is available as Mg
50% * .1102 g of "MgO" in Mg per 1 g of Slag    0.001366906  mol Mg/1 g of Slag
1 mol of MgO per mol Mg
molar weight MgO = 40.31 g/mol
rest of "MgO" in forms that do not react to
produce or consume $Ca(OH)_2$
Rxns: (assume all are 90% complete)

| | | |
|---|---|---|
| $Mg + 2H_2O \rightarrow Mg(OH)_2 + H_2$ | 0.001230216 | mol $Mg(OH)_2$ produced/1 g of Slag |
| $Mg(OH)_2 + CO_2 \rightarrow MgCO_3 + H_2O$ | 0.001107194 | mol $CO_2$ consumed/1 g of Slag |
| | 0.048727619 | g of $CO_2$ consumed/1 g of Slag |

Blast Furnace Slag: Total $CO_2$ Consumed (sequestered) in CLSM

| | |
|---|---|
| 0.025 | g of $CO_2$ consumed (sequestered)/g of Slag in Ca reactions |
| 0.000 | g of $CO_2$ consumed (sequestered)/g of Slag in Na reactions |
| 0.001 | g of $CO_2$ consumed (sequestered)/g of Slag in K reactions |
| 0.049 | g of $CO_2$ consumed (sequestered)/g of Slag in Mg reactions |
| 0.074 | g of $CO_2$ consumed (sequestered)/g of Slag TOTAL |

Assumptions:

| | |
|---|---|
| 1683 | lb of of Slag/1 yd³ CLSM |
| | Sufficient $CO_2$ and $H_2O$ so that neither limit the reaction |
| 2283 | lb of CLSM/1 yd³ CLSM |
| 125 | lb of $CO_2$ consumed (sequestered)/yd³ of CLSM |
| 0.055 | lb of $CO_2$ consumed (sequestered)/lb of CLSM |

Annual Sequestration estimate
Assumptions:

| | |
|---|---|
| 100000 | tons of Slag |
| 119000 | yd³ CLSM produced |
| 7440 | tons of $CO_2$ consumed (sequestered) annually |

Thus, the invention provides products and processes that make environmentally beneficial use of the carbon dioxide produced as by-products of the combustion of fossil fuels in the combustion chambers of power and industrial production plants, the cement-kiln dust produced as a by-product of portland cement production, the lime-kiln dust produced as a by-product of lime production, and the slag cement produced as a by-product of iron and steel production. In the process, a foam including a foaming agent and flue gas including carbon dioxide is formed, and the foam is added to a mixture including a cementitious material (e.g., cement-kiln dust, lime-kiln dust, or slag cement) and water to form a foamed mixture. Thereafter, the foamed mixture is allowed to set, preferably to a controlled low-strength material having a compressive strength of 1200 psi or less. The carbon dioxide in the flue gas reacts with hydration products in the controlled low-strength material and in turn sequesters the carbon dioxide.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

INDUSTRIAL APPLICABILITY

The invention relates to a process for sequestering carbon dioxide through the production of lightweight controlled low-strength materials. In one process of the invention, carbon dioxide from the flue gas of a coal combustion chamber is sequestered. In the process, a foam including a foaming agent and the flue gas is formed, and the foam is added to a mixture including a cementitious material (e.g., cement-kiln dust, lime-kiln dust, or slag cement) and water to form a foamed mixture. Thereafter, the foamed mixture is allowed to set into a controlled low-strength material in which the carbon dioxide is sequestered.

What is claimed is:

1. A process for preparing a controlled low-strength material having a compressive strength of 1200 psi or less, the process comprising:
 preparing a mixture including water and a cementitious material, wherein the cementitious material is selected from the group consisting of cement-kiln dust, lime-kiln dust, and slag cement;
 recovering exhaust gas from a combustion chamber, wherein the exhaust gas includes carbon dioxide;
 forming a foam including a foaming agent and the exhaust gas;

mixing the foam into the mixture to form a foamed mixture; and thereafter allowing the foamed mixture to set to form the controlled low-strength material, wherein during the step of allowing the foamed mixture to set, the carbon dioxide in the exhaust gas reacts with hydration products in the controlled low-strength material to sequester carbon dioxide.

2. The process of claim 1 wherein:
coal is combusted in the combustion chamber.

3. The process of claim 1 wherein:
the controlled low-strength material has a compressive strength of 300 psi or less.

4. The process of claim 1 further comprising:
shaping the foamed mixture into aggregates before allowing the foamed mixture to set.

5. The process of claim 1 further comprising:
subjecting the foamed mixture to a shaping process selected from pelletizing, extruding and briquetting before allowing the foamed mixture to set.

6. The process of claim 1 further comprising:
crushing the controlled low-strength material after the controlled low-strength material has set.

7. The process of claim 6 further comprising:
separating the crushed controlled low-strength material into different particle size fractions.

8. The process of claim 1 wherein:
the step of allowing the foamed mixture to set includes passing a heated fluid over the foamed mixture.

9. The process of claim 1 wherein:
the cementitious material is cement-kiln dust.

10. The process of claim 9 wherein:
the foamed mixture includes 1100-1400 pounds of cement-kiln dust per cubic yard of the foamed mixture and 800 to 1100 pounds of water per cubic yard of the foamed mixture.

11. The process of claim 10 wherein:
the foamed mixture includes 5 to 60 cubic feet of foam per cubic yard of the foamed mixture.

12. The process of claim 1 wherein:
the cementitious material is lime-kiln dust.

13. The process of claim 12 wherein:
the foamed mixture includes 1400-1800 pounds of lime-kiln dust per cubic yard of the foamed mixture and 500 to 800 pounds of water per cubic yard of the foamed mixture.

14. The process of claim 13 wherein:
the foamed mixture includes 7 to 40 cubic feet of foam per cubic yard of the foamed mixture.

15. The process of claim 1 wherein:
the cementitious material is slag cement.

16. The process of claim 15 wherein:
the foamed mixture includes 1400-1800 pounds of slag cement per cubic yard of the foamed mixture and 500 to 800 pounds of water per cubic yard of the foamed mixture.

17. The process of claim 16 wherein:
the foamed mixture includes 10 to 40 cubic feet of foam per cubic yard of the foamed mixture.

18. A process for sequestering carbon dioxide from exhaust gas emitted from a combustion chamber, the process comprising:

forming a foam including a foaming agent and the exhaust gas;

mixing the foam with a mixture including a cementitious material, wherein the cementitious material is selected from the group consisting of cement-kiln dust, lime-kiln dust, and slag cement, to form a foamed mixture; and allowing the foamed mixture to set, wherein the mixture sets to a controlled low-strength material having a compressive strength of 1200 psi or less, and wherein during the step of allowing the foamed mixture to set, the carbon dioxide in the exhaust gas reacts with hydration products in the controlled low-strength material to sequester carbon dioxide.

19. The process of claim 18 wherein:
the mixture includes water, and
the cementitious material is cement-kiln dust.

20. The process of claim 18 wherein:
the mixture includes water, and
the cementitious material is lime-kiln dust.

21. The process of claim 18 wherein:
the mixture includes water, and
the cementitious material is slag cement.

22. A process for sequestering carbon dioxide from a gas including one weight percent or more carbon dioxide, the process comprising:

forming a foam including a foaming agent and the gas;

mixing the foam with a mixture including water and a material selected from the group consisting of cement-kiln dust, lime-kiln dust, and slag cement, to form a foamed mixture; and allowing the foamed mixture to set to a controlled low-strength material having a compressive strength of 1200 psi or less, wherein during the step of allowing the foamed mixture to set, the carbon dioxide in the exhaust gas reacts with hydration products in the controlled low-strength material to sequester carbon dioxide.

23. The process of claim 1 further comprising:
feeding the flue gas to a compressor to compress the flue gas to a higher pressure prior to forming the foam, the compressed exhaust gas being used to expand the foaming agent during the forming of the foam.

24. The process of claim 18 further comprising:
feeding the flue gas to a compressor to compress the flue gas to a higher pressure prior to forming the foam, the compressed exhaust gas being used to expand the foaming agent during the forming of the foam.

25. The process of claim 22 further comprising:
feeding the flue gas to a compressor to compress the flue gas to a higher pressure prior to forming the foam, the compressed exhaust gas being used to expand the foaming agent during the forming of the foam.

* * * * *